(12) United States Patent
Igarashi

(10) Patent No.: US 8,179,561 B2
(45) Date of Patent: May 15, 2012

(54) OPTICAL SCANNING DEVICE AND IMAGE FORMING APPARATUS USING THE SAME

(75) Inventor: Jun Igarashi, Nikko (JP)

(73) Assignee: Canon Kabushiki Kaisha, Tokyo (JP)

( * ) Notice: Subject to any disclaimer, the term of this patent is extended or adjusted under 35 U.S.C. 154(b) by 1158 days.

(21) Appl. No.: 11/965,200

(22) Filed: Dec. 27, 2007

(65) Prior Publication Data
US 2008/0165393 A1   Jul. 10, 2008

(30) Foreign Application Priority Data
Jan. 6, 2007   (JP) ................................ 2007-000872

(51) Int. Cl.
  *H04N 1/00* (2006.01)
(52) U.S. Cl. ... 358/1.6; 358/481; 359/205.1; 359/207.1; 359/207.2; 359/207.7; 347/258; 347/259; 347/260; 347/261; 347/243
(58) Field of Classification Search .......... 358/1.6, 358/481; 359/205.1–207.7, 216.1–219.2; 347/258–261, 243–244
See application file for complete search history.

(56) References Cited

U.S. PATENT DOCUMENTS
6,831,763 B2   12/2004 Takakubo
2006/0238849 A1 * 10/2006 Ishibe ........................ 359/207

FOREIGN PATENT DOCUMENTS
JP   10-62685   3/1998
JP   2004-102050   4/2004
* cited by examiner

*Primary Examiner* — Twyler Haskins
*Assistant Examiner* — Brendan McCommas
(74) *Attorney, Agent, or Firm* — Fitzpatrick, Cella, Harper & Scinto

(57) ABSTRACT

An optical scanning device includes an input optical system having an input optical element, for projecting a light beam from a light source device onto a deflecting surface of an optical deflector, and an imaging optical system having an imaging optical element, for imaging the light beam scanningly deflected by the deflecting surface of the optical deflector, on a surface to be scanned, wherein the light beam is obliquely incident on the deflecting surface in a sub-scan section, wherein the imaging optical element has at least one optical surface which is decentered in the sub-scan section, wherein the input optical element has at least one optical surface having an asymmetric and aspherical surface shape, wherein the input optical element has a thickness dm1 in the sub-scan section and at a position where a first marginal light ray of the light beam passing through the input optical system, which first marginal light ray is closer to an optical reference axis than the principal ray of that light beam is, passes, as well as a thickness dm2 at a position where a second marginal light ray further remote from the optical reference axis than the principal light ray of the light beam is, passes, and wherein dm1<dm2.

13 Claims, 12 Drawing Sheets

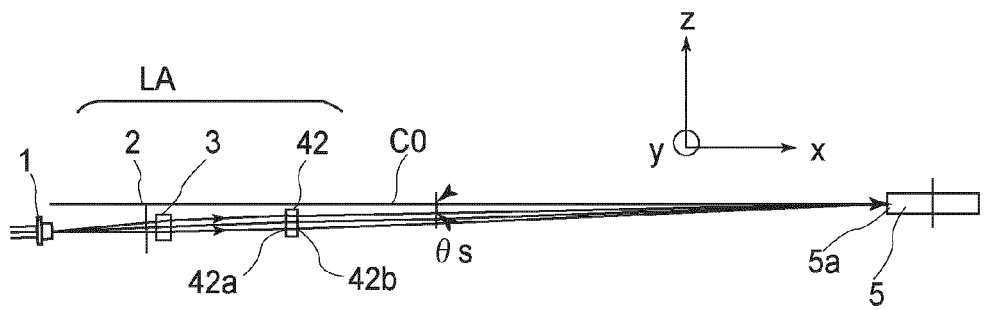
FIG.13
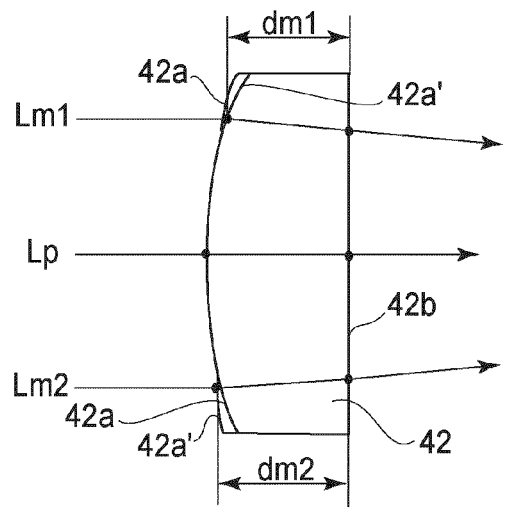
FIG.14
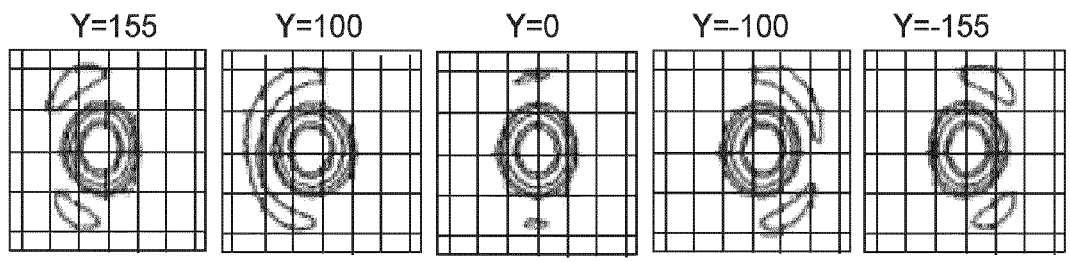
FIG.15
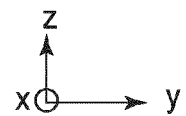

OPTICAL SCANNING DEVICE AND IMAGE FORMING APPARATUS USING THE SAME

FIELD OF THE INVENTION AND RELATED ART

This invention relates to an optical scanning device and an image forming apparatus using the same. More particularly, the present invention is effectively applicable to an image forming apparatus such as a laser beam printer or a digital copying machine having an electrophotographic process or a multi-function printer, for example.

Optical scanning devices are used in image forming apparatuses such as digital copying machine or laser beam printer (LBP), for example.

In this type of optical scanning devices, as a measure for reducing in size of the overall system, or as a measure for separating plural light beams when these light beams are to be scanned by the same optical deflector, there is a method using an oblique incidence optical system in which a light beam is incident on the deflecting surface of the optical deflector in an oblique direction in the sub-scan section.

With this arrangement, the size of the overall system can be reduced and the plural light beams can be spatially separated effectively.

Several proposals have been made in regard to optical scanning devices based on such method (see patent documents No. 1 and No. 2).

Patent document No. 1 discloses an optical scanning device having an oblique incidence optical system in which, as shown in FIG. 21, light which is reflected by the deflecting surface 81a of an optical deflector 81 at an angle θ enters an imaging lens 82 having lens surfaces 82a and 82b which are decentered in the sub-scan section.

Based on this, the scan line curve on a surface 87 to be scanned is adjusted and, additionally, the amount of decentration L1 and L2 of the lens surfaces 82a and 82b of the imaging lens 82 is set so as to minimize the comatic aberration in the sub-scan direction due to the decentration.

Patent document No. 2 discloses an optical scanning device having an oblique incidence optical system in which, as shown in FIG. 22, light which is reflected by the deflecting surface of an optical deflector 93 at an angle 1.9 degrees is imaged by imaging lenses 94a and 94m upon a surface s to be scanned.

Here, the light exit surface 94a-m of the imaging lens 94a is defined by a two-dimensional polynomial aspherical surface which has an asymmetrical shape with respect to the sub-scan direction.

Based on this, the scan line curve is adjusted and wavefront aberration is well suppressed. In FIG. 22 denoted at Ax and Ax' are optical reference axes, respectively.

[Patent Documents]

No. 1: Japanese Laid-Open Patent Application No. 10-62685
No. 2: Japanese Laid-Open Patent Application No. 2004-102050

Generally, if both of the scan line curve and comatic aberration in the sub-scan direction are going to be adjusted by using an imaging lens, it would be necessary to arrange an imaging lens having a long length in a very complicatedly decentered shape.

Then, the installation error of imaging lens easily occurs and, when the image formation is carried out based on a single light beam, the image precision would be lost due to the scan line curve.

Furthermore, when the image formation is carried out based on plural light beams, since a plurality of scan lines would have different bends, it causes a problem of the color misregistration.

Furthermore, if the scan line curve and comatic aberration in the sub-scan direction are going to be well adjusted (compensated) by using the imaging lens 94a disclosed in patent document No. 2, since an elongated imaging lens has to be set in a very complicated configuration in the sub-scan section, the lens molding becomes quite difficult.

SUMMARY OF THE INVENTION

Briefly, the present invention provides an optical scanning device by which high quality image can be produced without deterioration of image performance and yet through a compact structure.

The present invention also provides an image forming apparatus having such optical scanning device.

Furthermore, the present invention provides an optical scanning device by which, when incorporated into a color laser beam printer (LBP) or a color copying machine, a high quality image can be produced without image performance degradation such as color misregistration.

The present invention also provides an image forming apparatus having such optical scanning device.

In accordance with an aspect of the present invention, there is provided an optical scanning device, comprising: light source means; an optical deflector having a deflecting surface; an input optical system having an input optical element and configured to project a light beam emitted from said light source means onto the deflecting surface of said optical deflector; and an imaging optical system having an imaging optical element and configured to image a light beam scanningly deflected by the deflecting surface of said optical deflector, on a surface to be scanned; wherein the light beam incident on the deflecting surface of said optical deflector is obliquely incident in a sub-scan section with respect to a normal to the deflecting surface, wherein said imaging optical element of said imaging optical system has at least one optical surface which is decentered in the sub-scan section, wherein said input optical element of said input optical system has at least one optical surface having an aspherical surface shape being asymmetric, in the sub-scan section, with respect to a principal ray of a light beam passing through an optical element, wherein, when a thickness of said input optical element in the sub-scan section and at a position where a first marginal light ray of the light beam passing through said input optical system, which first marginal light ray is closer to an optical reference axis than the principal ray of that light beam is, passes, is denoted by dm1 (mm), while a thickness of said input optical element at a position where a second marginal light ray further remote from the optical reference axis than the principal light ray of the light beam is, passes, is denoted by dm2 (mm), a relation $$dm1 < dm2$$

is satisfied, where the optical reference axis is defined as an axis which, when a principal ray of a light beam emitted from said input optical system is scanningly deflected by the deflecting surface of said optical deflector and is then incident at a center of the scanned surface with respect to a main-scan direction, passes through a deflection point for the principal ray of the light beam on the deflecting surface in the sub-scan section and which is perpendicular to the deflecting surface.

In accordance with one preferred form of this aspect of the present invention, the input optical element has a shape in the sub-scan section which shape is determined by different aspherical coefficients at the opposite sides of an optical axis of said input optical element, and wherein the aspherical coefficient at one side of the optical axis has a finite value while the aspherical coefficient at the other side of the optical axis is equal to zero.

The input optical element may have a shape in the sub-scan section which shape is determined by different aspherical coefficients at the opposite sides of a principal ray of a light beam passing through said input optical system, wherein the aspherical coefficient at one side of the principal ray close to the optical reference axis may have a finite value while the aspherical coefficient at the other side of the principal ray remote from the optical reference axis may be equal to zero.

The input optical element may have a shape in the sub-scan section which shape is determined by different aspherical coefficients at the opposite sides of an optical axis of said input optical element, and said different aspherical coefficients may have different signs.

In a main-scan section, the shape of a meridional which connects sagittal vertexes of at least one optical surface of said imaging optical element may be defined by a curved line which, from an axial position to an abaxial position in the main-scan direction, may be curved to deviate in a direction leaving to the optical reference axis, with respect to a meridional shape to be defined based on a curvature radius on the optical reference axis.

At least one optical surface of said imaging optical element may be parallel decentered (translationally decentered) in the sub-scan section.

At least one optical surface of said imaging optical element may be rotationally decentered in the sub-scan section about an axis which is parallel to the main-scan direction.

The imaging optical element having an optical surface parallel decentered in the sub-scan section may have a positive power, and the parallel decentration may be made in such direction that the optical axis of said imaging optical element leaves from the optical reference axis.

In accordance with another aspect of the present invention, there is provided an image forming apparatus, comprising: a plurality of optical scanning devices as recited in claim 1 and having a plurality of light source devices; and common deflecting means shared by said plurality of optical scanning devices, wherein a plurality of light beams emitted from said plurality of light source devices are scanningly deflected by said common deflecting means such that a plurality of surfaces to be scanned are scanned with the plurality of deflected light beams, respectively, whereby images are formed on the surfaces.

In one preferred form of this aspect of the present invention, when an imaging magnification of the imaging optical systems of said plurality of optical scanning devices in the sub-scan section is denoted by βs, a relation $$1.0 \leq |\beta s| \leq 3.0$$

is satisfied.

When an oblique incidence angle defined between a principal ray of a light beam incident on the deflecting surface of said optical deflector and a normal to the deflecting surface is denoted by θs (deg), a relation $$1.0(\deg) \leq \theta s \leq 5.0(\deg)$$

may be satisfied.

In accordance with a further aspect of the present invention, there is provided an image forming apparatus, comprising: an optical scanning device as recited above; a photosensitive member disposed at a surface to be scanned; a developing device for developing an electrostatic latent image formed on said photosensitive member with a light beam scanningly deflected by said optical scanning device, to produce a toner image; a transferring device for transferring the developed toner image onto a transfer material; and a fixing device for fixing the transferred toner image, on the transfer material.

In accordance with a yet further aspect of the present invention, there is provided an image forming apparatus, comprising: an optical scanning device as recited above; and a printer controller for converting code data supplied from an outside machine into an imagewise signal and for inputting the imagewise signal into said optical scanning device.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 13 is a sectional view along a sub-scan section, of an optical scanning device according to a second embodiment of the present invention, from light source means of an optical deflector.

FIG. 14 is a sectional and enlarged view along the sub-scan section, of an anamorphic lens of the second embodiment of the present invention.

FIG. 15 is a diagram which shows a spot shape in the second embodiment of the present invention.

DESCRIPTION OF THE PREFERRED EMBODIMENTS

Preferred embodiments of the present invention will now be described with reference to the attached drawings.

[Embodiment 1]

Figure 1:
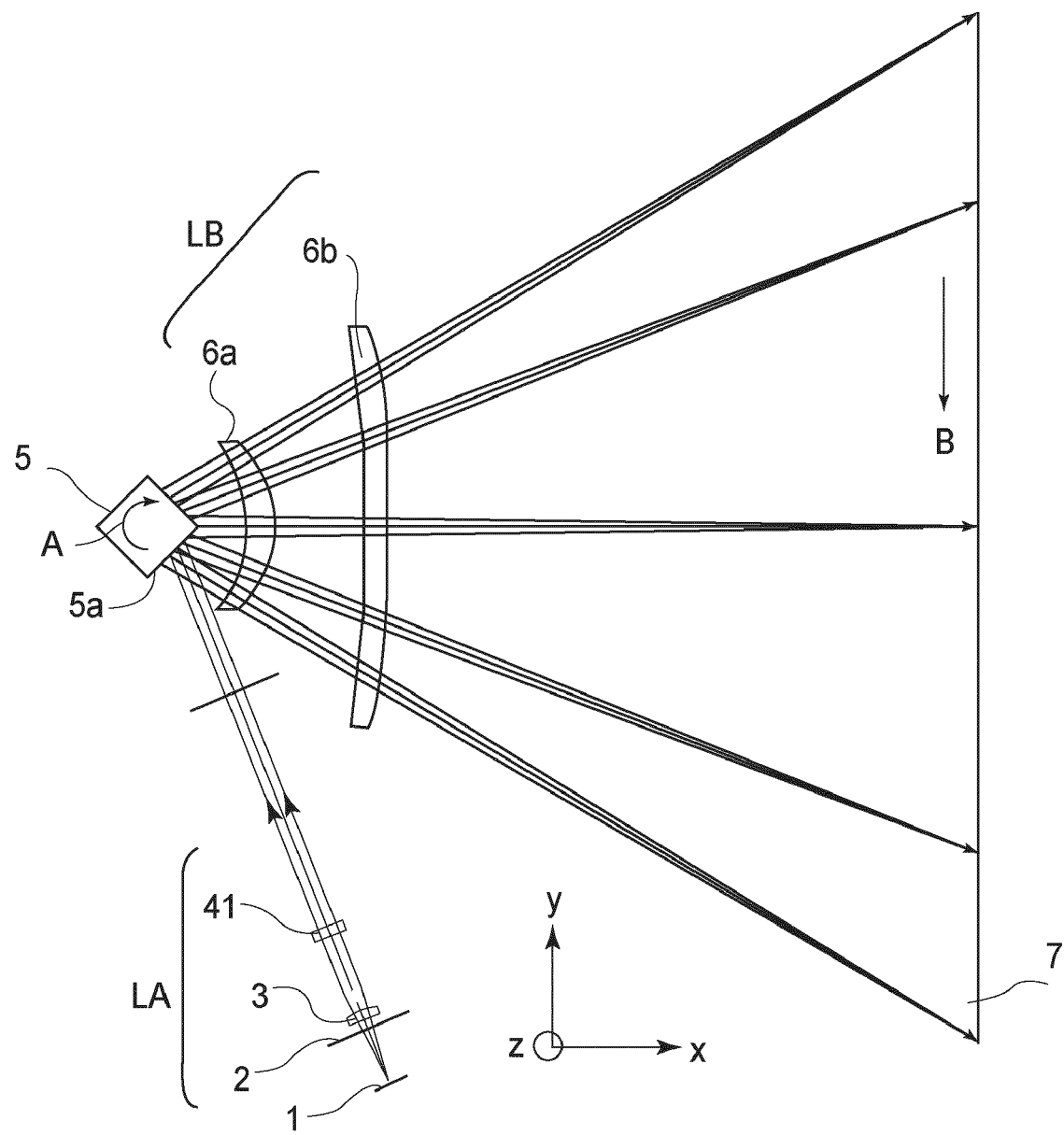
FIG. 1 is sectional view along a main-scan section, of an optical scanning device according to a first embodiment of the present invention.

FIG. 1 is a sectional view along a main-scan direction (main-scan sectional plane) of a main portion of an optical scanning device according to a first embodiment of the present invention.

Figure 2:
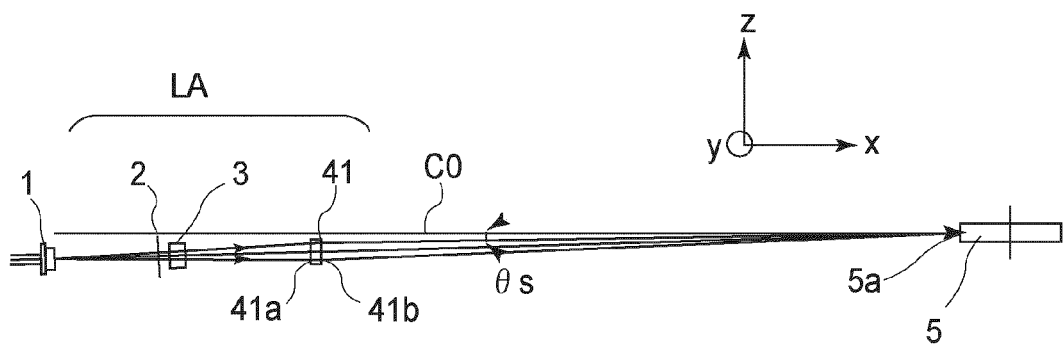
FIG. 2 is a sectional view along a sub-scan section, of the optical scanning device according to the first embodiment of the present invention, from light source means of an optical deflector.

FIG. 2 is a sectional view along a sub-scan direction (sub-scan sectional plane) of a main portion of the optical scanning device according to the first embodiment, from light source means to an optical deflector.

Figure 3:
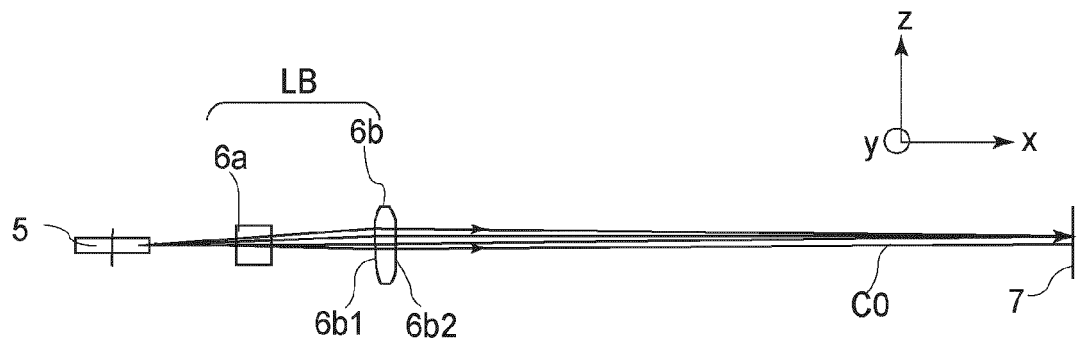
FIG. 3 is a sectional view along the sub-scan section, of the optical scanning device according to the first embodiment of the present invention, from the optical deflector to a surface to be scanned.
Figure 4A:
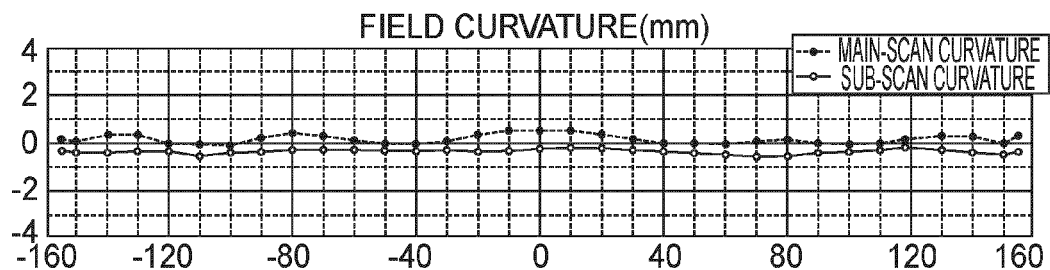
FIG. 4A through FIG. 4D are graphs for explaining geometric aberration and uniformity of sub-scan magnification in the first embodiment of the present invention.
Figure 4B:
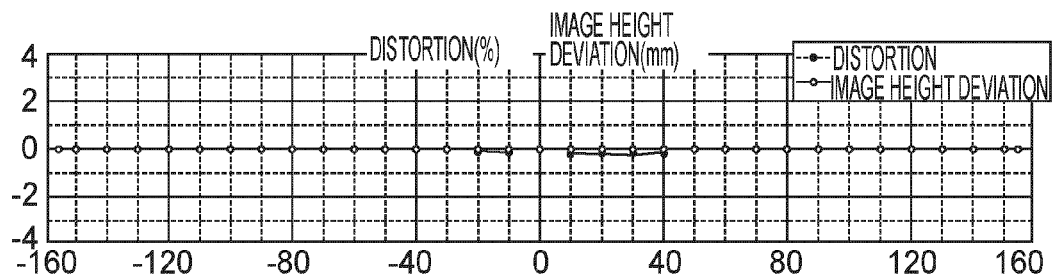
Figure 4C:
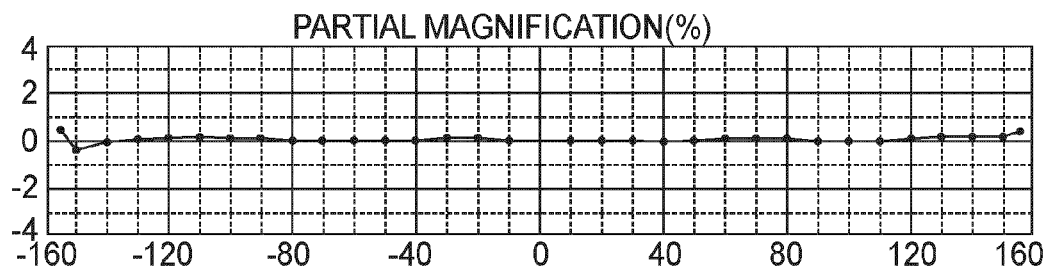
Figure 4D:
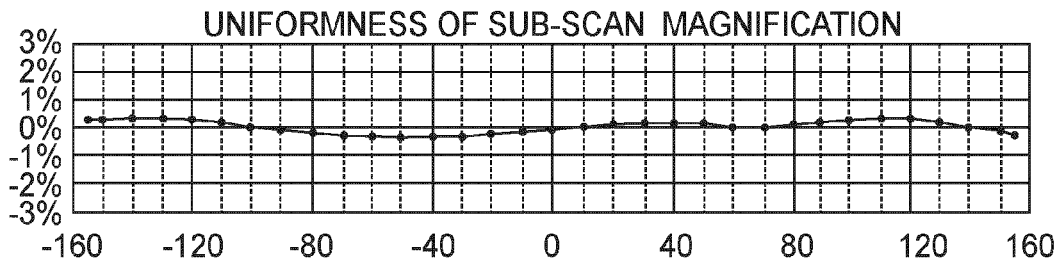

FIG. 3 is a sectional view along a sub-scan direction (sub-scan sectional plane) of a main portion of the optical scanning device according to the first embodiment, from the optical deflector to a surface to be scanned.

In this specification, the term "main-scan direction" (Y direction) refers to a direction which is perpendicular to the rotational axis of the optical deflector and to the optical axis (X direction) of an imaging optical system (that is, a direction in which a light beam is scanningly deflected by the optical deflector).

The term "sub-scan direction" (Z direction) refers to a direction which is parallel to the rotational axis of the deflecting means.

The term "main-scan section" refers to a plane which is parallel to the rotational axis of the optical deflector and which an optical reference axis C0 to be described below.

The term "sub-scan section" refers to a plane which is perpendicular to the main-scan section.

Here, the optical reference axis C0 refers to such axis that: when a principal ray of a light beam emitted by an input optical system is deflected by a deflecting surface of an optical deflector and is incident on the center of a surface to be scanned, with respect to the main-scan direction, the optical reference axis is an axis which, within the sub-scan section, passes through the point of deflection for the principal ray of the light beam on the deflecting surface and which is perpendicular to the deflecting surface.

Denoted in the drawing at 1 is a light source means which comprises a semiconductor laser, for example. It should be noted that, although in this embodiment the light source means is comprised of a single light emitting member (light emission point), this is not a requisition. It may be comprised of two or more light emitting members, for example. Alternatively, it may be comprised of a plurality of light sources each having a single light emitting member. If a plurality of light emitting members is used, the optical scanning speed can be improved without increasing the rotational speed of the optical deflector.

Denoted at 2 is an aperture stop which restricts a divergent light beam emitted from the light source means 1 to shape its beam profile.

Denoted at 3 is a condenser lens as a collecting optical system (collimator lens), and it serves to transform the divergent light beam emitted from the light source means 1 and passed through the aperture stop 2 into parallel light (or convergent light).

Denoted at 41 is an anamorphic lens as an input optical element. It has a refracting power (power) only in the sub-scan direction, and it functions to image the light beam passed through the condenser lens 3 into a linear image in the sub-scan section, on the deflecting surface 5a of an optical deflector 5 to be described below.

The anamorphic lens 41 of this embodiment comprises at least one surface of asymmetrical shape in the sub-scan section (asymmetric shape with respect to the optical axis of the anamorphic lens 41), and the optical surface thereof has an asymmetric and aspherical surface shape (aspherical surface shape being asymmetric with respect to the optical axis).

Namely, at least one lens surface of the anamorphic lens 41 has an aspherical surface shape which is asymmetric in the sub-scan section with respect to the principal ray of the light beam passing through the anamorphic lens 41.

Here, components such as aperture stop 2, condenser lens 3, and anamorphic lens 41 are constituent elements of the input optical system LA. The condenser lens 3 and the anamorphic lens 41 may be provided by a single optical element.

Denoted at 5 is an optical deflector as deflecting means which comprises a polygon mirror (rotary polygonal mirror) of four-surface structure having a circumscribed circle diameter of 20 mm. The polygon mirror is rotated at a constant speed (constant angular-speed) in the direction of an arrow A in the drawing, by driving means such as a motor (not shown).

Denoted at LB is an imaging optical system which has a light collecting function and an fθ characteristic to be described below. The imaging optical system is comprised of first and second imaging lenses 6a and 6b (hereinafter, these will be referred to also as "scanning lens" or "fθ lens") as imaging optical elements having different powers between the main-scan direction and sub-scan direction.

The term "fθ characteristic" means that the optical system is configured so that a light beam incident with a certain field angle (scan angle) θ is imaged on the image plane (scanned surface 7) at a position of Y=f*θ, where Y is the height from the optical axis and f is a constant.

In other words, it refers to such characteristic that the scan width (scanning speed) scanned per unit field angle is even over the whole area of the effective scan region on the scanned surface. Here, the constant f is called an fθ coefficient.

Furthermore, if the light beam incident on the imaging lens is parallel light, then the constant f is equivalent to the paraxial focus distance f.

The first and second imaging lenses 6a and 6b are made of a plastic material, and they serve to image the light beam based on imagewise information and reflectively deflected by the optical deflector 5, on the photosensitive drum surface 7 as the scanned surface.

Additionally, the first and second imaging lenses 6a and 6b provide an optically conjugate relation, within the sub-scan section, between the deflecting surface 5a of the optical deflector 5 and the photosensitive drum surface 7, by which surface tilt compensation of the deflecting surface is accomplished.

Along the optical axis of the first imaging lens 6a described above, the first imaging lens 6a of the present embodiment has a positive power in the main-scan section and a negative power in the sub-scan section. On the other hand, along the optical axis of second imaging lens 6b as described above, the second imaging lens 6b has a negative power in the main-scan section and a positive power in the sub-scan section.

Denoted at 7 is a photosensitive drum surface as a surface to be scanned.

In the present embodiment, the divergent light beam emitted from the light source means 1 is restricted in light quantity thereof by means of the aperture stop 2. Then, the light beam is converted into parallel light by the condenser lens 3, and it is incident on the anamorphic lens 41.

As far as the main-scan section is concerned, the parallel light beam incident on the anamorphic lens 41 goes out of it while being unchanged with respect to the main-scan section. Within the sub-scan section, on the other hand, the light beam is converged to form a line image (linear image elongating in the main-scan direction) on the deflecting surface 5a of the optical deflector 5.

Here, the light beam to be incident on the deflecting surface of the optical deflector 5 is incident thereon within the sub-scan section, obliquely with respect to a normal to the deflecting surface 5a of the optical deflector 5.

In other words, the light beam to be incident on the deflecting surface of the optical deflector 5 is incident thereon at an oblique incidence angle θs (in the present embodiment, θs=1.8 deg.) in the sub-scan section with respect to a normal to the deflecting surface 5a of the optical deflector 5.

Then, the light beam deflected by the deflecting surface 5a is imaged on the photosensitive drum surface 7 as a light spot, by means of the first and second imaging lenses 6a and 6b.

Then, by rotating the optical deflector 5 in the direction of an arrow A, the photosensitive drum surface 7 is optically scanned in the direction of an arrow B (main-scan direction). Based on this, imagewise recording is carried out on the photosensitive drum surface 7 as the recording medium.

It should be noted that scanning a printing span of "A3" size is assumed in this embodiment and, thus, the optical system is configured to provide an effective scan width of 310 mm on the surface to be scanned.

However, the invention is not limited to this, and the optical scanning device can meet any larger size or smaller size.

The shape of the refracting surfaces of the first and second imaging lenses 6a and 6b of this embodiment is expressed by a configuration expression as follows.

If the point of intersection with the optical axis is taken as an origin, the optical axis direction is taken as X axis, an axis orthogonal to the optical axis within the main-scan section is taken as Y axis, an axis orthogonal to the optical axis in the sub-scan section is taken as Z axis, then the meridional direction corresponding to the main-scan direction is expressed by the following equation.

$$X = \frac{Y^2/R}{1 + (1 - (1+K)(Y/R)^2)^{1/2}} + B_4 Y^4 + B_6 Y^6 + B_8 Y^8 + B_{10} Y^{10} \quad \text{(a)}$$

where R is the meridional curvature radius on the optical axis, and K, B4, B6, B8 and B10 are aspherical coefficients.

Furthermore, the sagittal direction corresponding to the sub-scan direction (a direction containing the optical axis and being orthogonal to the main-scan direction) is expressed by the following equation.

$$S = \frac{Z^2/r'}{1 + (1 - (Z/r')^2)^{1/2}} \quad \text{(b)}$$

Here, the curvature radius (sagittal curvature radius) r' in the sub-scan direction at a position spaced apart in the main-scan direction by Y from the optical axis, is expressed by the following equation.

$$r' = r_0(1 + D_2 Y^2 + D_4 Y^4 + D_6 Y^6 + D_8 Y^8 + D_{10} Y^{10})$$

where $r_0$ is the sagittal curvature radius on the optical axis, and $D_2$, $D_4$, $D_6$, $D_8$ and $D_{10}$ are coefficients.

It is to be noted that the abaxial sagittal curvature radius r' is defined in a plane which contains a normal to the meridional at individual positions and which is perpendicular to the main-scan section.

Furthermore, although the polynomial in the surface configuration expression is expressed based on a function up to tenth order, the order may be higher or lower than this.

Furthermore, any other surface configuration expression may be used as long as it has equivalent surface expression flexibility. Similar advantageous effects of the present invention will be attainable.

Table 1 and Table 2 below show the optical disposition of the optical elements and the surface shape of the imaging optical element (imaging lens) in the first embodiment of the present invention.

In Table 2, the first surface is the light entrance surface of the first imaging lens 6a, and the second surface is the light exit surface of the first imaging lens 6a. The third surface is the light entrance surface of the second imaging lens 6b, and the fourth surface is the light exit surface of the second imaging lens 6b. Furthermore, "E–x" means "$10^{-x}$".

Here, aspherical coefficients B4u-B10u and D2u-D10u are coefficients which specify the shape of the lens surface in the main-scan section and the sub-scan section, at a side of the optical axis which is remote from the light source means 1.

Furthermore, aspherical coefficients B4l-B10l and D2l-D10l are coefficients which specify the shape of the lens surface in the main-scan section and the sub-scan section, at the light source means 1 side of the optical axis (at a side of the optical axis facing the light source means).

In this embodiment, the light beam emitted from the light source means 1 is incident on the deflecting surface 5a of the optical deflector 5 at a certain angle in the main-scan section, with respect to the optical axis of the imaging optical system LB. Therefore, with the rotation of the optical deflector 5, reciprocal displacement (sag) of the deflecting surface of the optical deflector 5 occurs asymmetrically between the scan start side and the scan end side.

In order to sufficiently compensate the phenomenon that the field curvature or spot diameter varies asymmetrically in the main-scan direction with respect to the optical axis, due to asymmetric sag as described above, the first and second imaging lenses 6a and 6b are formed with a surface whose curvature radius in the sub-scan direction changes asymmetrically along the main-scan direction, with respect to the optical axis.

As shown in Table 2, the aspherical coefficients B4u-B10u and B4l-B10l of the second and fourth surfaces in the main-scan section are different, and it is seen that the shape in the main-scan section changes within the effective diameter of the lens surface, from an axial position to an abaxial position, and symmetrically with respect to the optical axis.

Furthermore, at the second, third and fourth surfaces, the aspherical coefficients D2u-D10u and D2l-D10l in the sub-scan section are different, and it is seen that the curvature in the sub-scan section changes within the effective diameter of the lens surface, from an axial position to an abaxial position, and asymmetrically with respect to the optical axis.

[Table 1]

TABLE 1

SCANNING SYSTEM DATA

| | | |
|---|---|---|
| Oblique Incidence Angle in Sub-Scan Direction (deg) | γ | 1.8 |
| fθ Coefficient (mm/rad) | f | 210 |
| Used Wavelength (nm) | λ | 790 |
| Scanning Lens Refractive Index | N | 1.523972 |
| Maximum Deflection Angle (deg) | θmax | 42.3 |
| Deflection Point to Scanning Lens R1 Surface Length (mm) | D1 | 26.2 |
| Scanning Lens R1 Surface to Scanning Lens R2 Surface Length (mm) | D2 | 9 |
| Scanning Lens R2 Surface to Scanning Lens R3 Surface Length (mm) | D3 | 28.5 |
| Scanning Lens R3 Surface to Scanning Lens R4 Surface Length (mm) | D4 | 5.3 |
| Scanning Lens R4 Surface to Scanned Surface Length (mm) | D5 | 179.3 |
| Deflection Point to Scanned Surface Length (mm) | L | 248.3 |

TABLE 2

| | 1st Surface | 2nd Surface | 3rd Surface | 4th Surface |
|---|---|---|---|---|
| R | −4.07E+01 | −2.81E+01 | −1.82E+02 | −5.04E+03 |
| K | −4.36E+00 | −2.39E+00 | −4.92E+01 | 7.35E+03 |
| B4u | −1.03E−05 | −1.04E−05 | −2.46E−07 | −1.19E−06 |
| B6u | 7.53E−09 | 5.38E−09 | −7.18E−12 | 1.81E−10 |
| B8u | −1.17E−11 | −5.00E−12 | 6.77E−15 | −1.92E−14 |
| B10u | 4.33E−15 | −1.56E−15 | −2.80E−18 | −2.08E−18 |
| B4l | −1.03E−05 | −1.04E−05 | −2.46E−07 | −1.18E−06 |
| B6l | 7.53E−09 | 5.56E−09 | −7.18E−12 | 1.77E−10 |
| B8l | −1.17E−11 | −5.58E−12 | 6.77E−15 | −1.57E−14 |
| B10l | 4.33E−15 | −1.35E−15 | −2.80E−18 | −2.63E−18 |
| r | −1.00E+03 | 2.50E+01 | 5.55E+01 | −3.20E+01 |
| D2u | 0 | 2.89E−04 | 2.27E−04 | 1.63E−04 |
| D4u | 0 | 4.95E−09 | −3.63E−08 | −4.51E−08 |
| D6u | 0 | 0 | 3.94E−11 | −2.37E−12 |
| D8u | 0 | 0 | −2.01E−14 | 5.42E−15 |
| D10u | 0 | 0 | 3.07E−18 | −8.56E−19 |
| D2l | 0 | 6.45E−05 | 1.85E−04 | 1.81E−04 |
| D4l | 0 | 3.12E−09 | −3.72E−09 | −8.97E−08 |
| D6l | 0 | 0 | 3.24E−11 | 2.78E−11 |
| D8l | 0 | 0 | −2.64E−14 | −2.60E−15 |
| D10l | 0 | 0 | 5.43E−18 | −2.19E−19 |

In the present embodiment, the light entrance surface and the light exit surface of the first imaging lens 6a are defined in the main-scan section by an aspherical surface shape (non-arcuate shape) which can be expressed by a function up to the tenth order. Within the sub-scan section, on the other hand, the light entrance surface has a flat surface shape, while the light exit surface is defined by a spherical shape having a curvature which changes in the main-scan direction.

The light entrance surface and the light exit surface of the second imaging lens 6b are defined in the main-scan section by an aspherical surface shape (non-arcuate shape) which can be expressed by a function up to the tenth order. The power in the sub-scan direction decreases from an axial position to an abaxial position along the main-scan direction, by which the field curvature in the sub-scan direction is well adjusted.

In this embodiment, the first and second imaging lenses 6a and 6b are made of a plastic material (resin). However, the material is not limited to plastic, and a glass may be used, for example.

FIG. 4A-FIG. 4D are diagrams which illustrate geometric aberration in the present embodiment.

It is seen from FIG. 4A-FIG. 4D that aberrations have been adjusted to practically acceptable level. Furthermore, it is seen that variation of sub-scan magnification due to the image height is suppressed to 2% or less.

Thus, variation of the spot shape in the sub-scan direction due to the image height is well suppressed, and good imaging performance is accomplished. Here, a change of sub-scan magnification of 10% or less acceptable, and a change of 5% or less is more desirable.

Referring now to FIG. 5A through FIG. 7B, the function and advantageous results of the present embodiment will be explained.

Figure 5A:
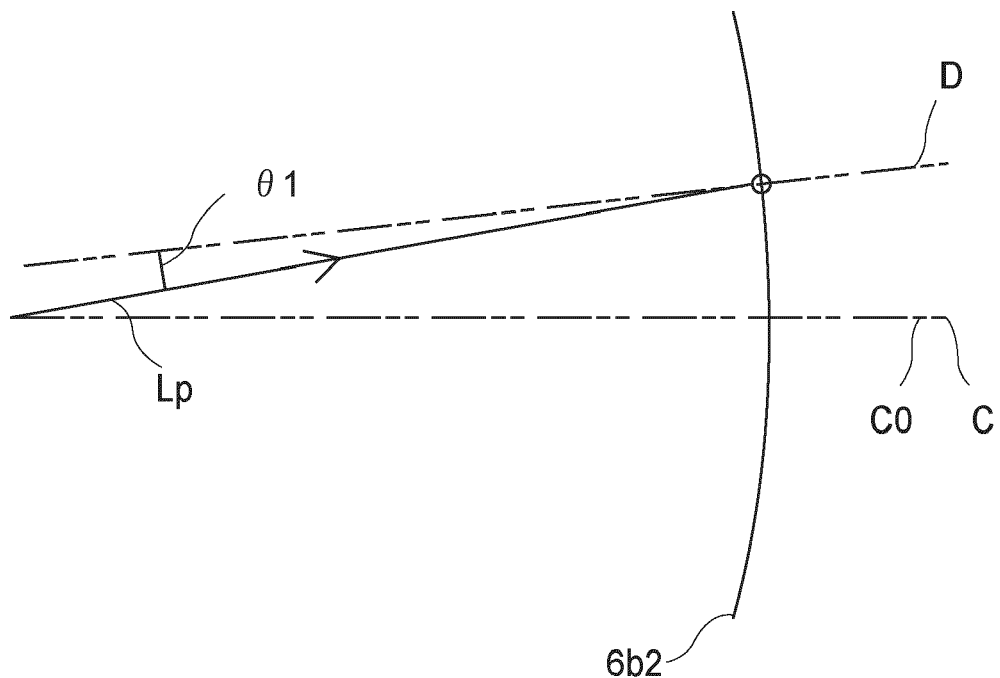
FIG. 5A and FIG. 5B are diagrams for explaining comatic aberration in the sub-scan direction due to the lens surface decentration.
Figure 5B:
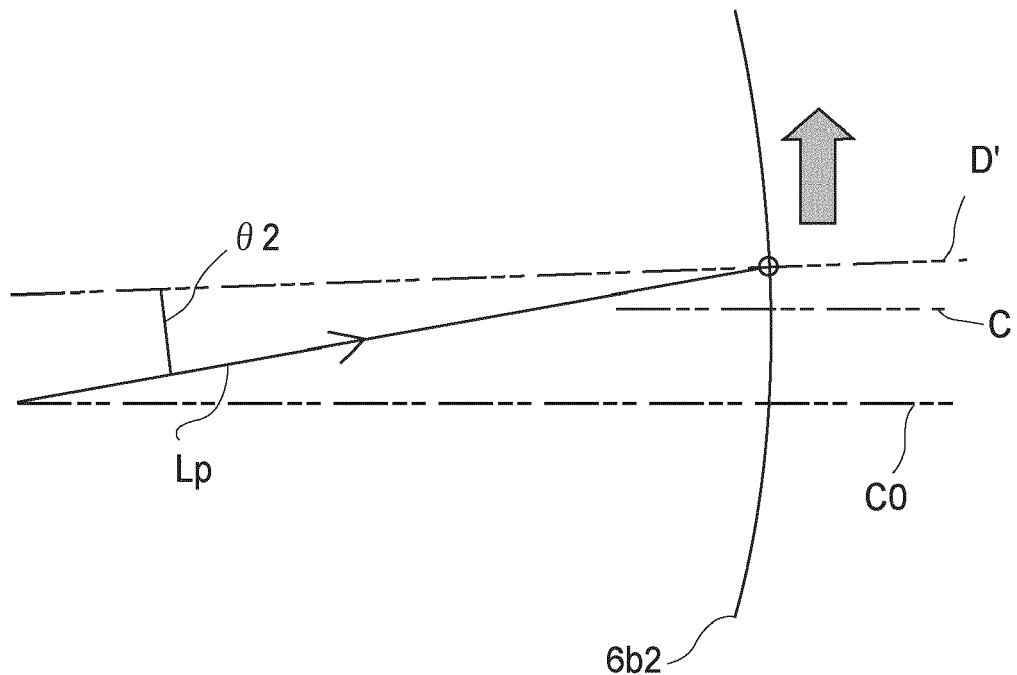
Figure 6:
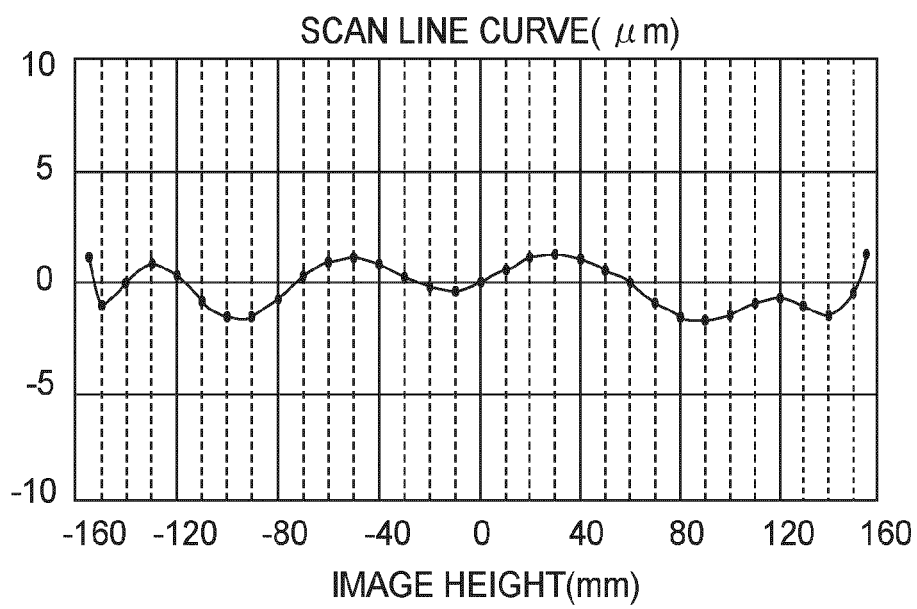
FIG. 6 is a graph for explaining the amount of scan line curve in the first embodiment of the present invention.
Figure 7A:
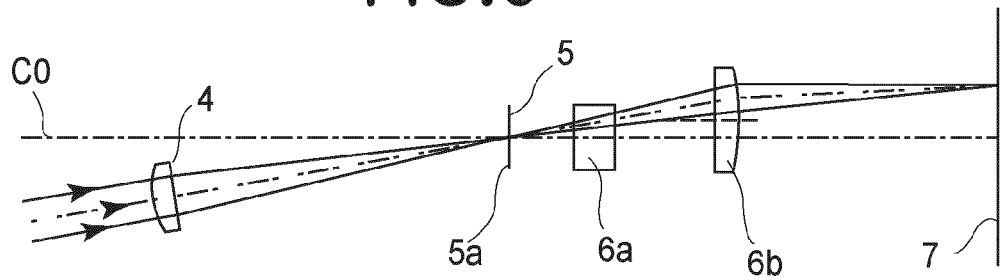
FIG. 7A and FIG. 7B are diagrams for explaining improvement of the comatic aberration in the sub-scan direction.
Figure 7B:
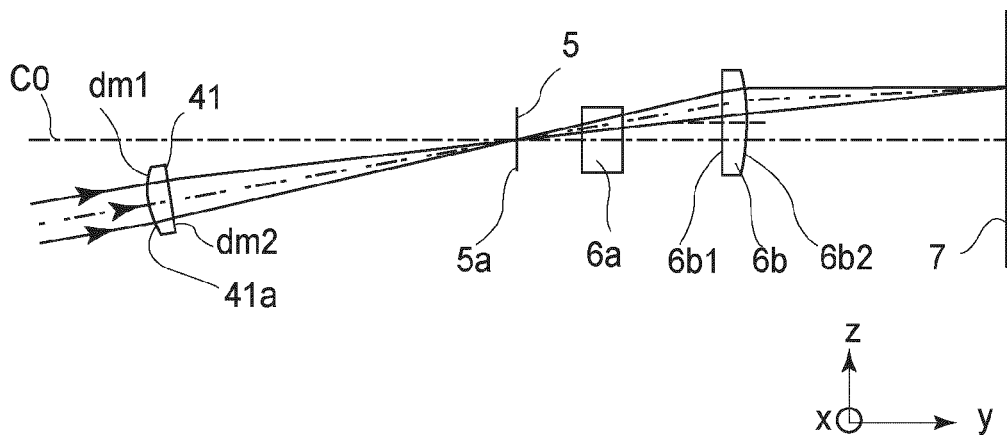

FIG. 5A and FIG. 5B are schematic diagrams for explaining comatic aberration in the sub-scan direction due to lens surface decentration. FIG. 6 is a graph which illustrates the amount of scan line curve. FIG. 7A and FIG. 7B are schematic diagrams for explaining improvements of the comatic aberration in the sub-scan direction.

In this embodiment, as described hereinbefore, the light beam is obliquely incident on the deflecting surface 5a of the optical deflector, in the sub-scan section. Thus, the light beam (oblique incidence light beam) to be scanningly deflected by the deflecting surface 5a is scanningly deflected at the same emission angle with respect to an axis which is perpendicular to the deflecting surface 5a. However, the optical path length (distance) up to the scanned surface 7 (final imaging plane) is different between scanning an axial area and scanning an abaxial area.

More specifically, the optical path length of an abaxial light beam is longer than that of an axial light beam. Therefore, the former is imaged at a larger height position in the sub-scan section, and this causes scan line curve on the scanned surface 7.

Then, if the image formation is carried out by using a single light beam, for example, the image precision will be lost by the scan line curve. On the other hand, if the image formation is carried out using a plurality of light beams, there occurs a difference in scan line bend among plural scan lines. This causes a problem of color misregistration.

In consideration of this, as shown in FIG. 5A and FIG. 5B, the optical axis C of the light exit surface 6b2 of the second imaging lens 6b having a power in the sub-scan direction is shifted from the state shown in FIG. 5A wherein it coincides with the optical reference axis C0, to the state shown in FIG. 5B.

Namely, the optical axis C of the light exit surface 6b2 of the second imaging lens 6b is shifted toward the sub-scan direction relative to the optical axis reference plane C0, into the state shown in FIG. 5B wherein the light exit surface 6b2 is parallel decentered (translationally decentered). Based on this, the emission angle of the light beam is controlled, and the scan line curve is adjusted.

FIG. 6 is a graph which illustrates the amount of scan line curve on the scanned surface 7.

In this embodiment, the light exit surface 6b2 of the second imaging lens 6b is parallel decentered relative to the optical reference axis by 1.1 mm in the sub-scan direction, to a side where the light beam passes. Based on this, the scan line curve is well adjusted as shown in FIG. 6.

Although in this embodiment only the light exit surface 6b2 is parallel decentered in the sub-scan direction, only the light entrance surface 6b1 may be parallel decentered in place of it or, alternatively, both of the light entrance surface and light exit surface 6b1 and 6b2 may be decentered. Similar advantageous results are obtainable in that occasion.

Figure 8:
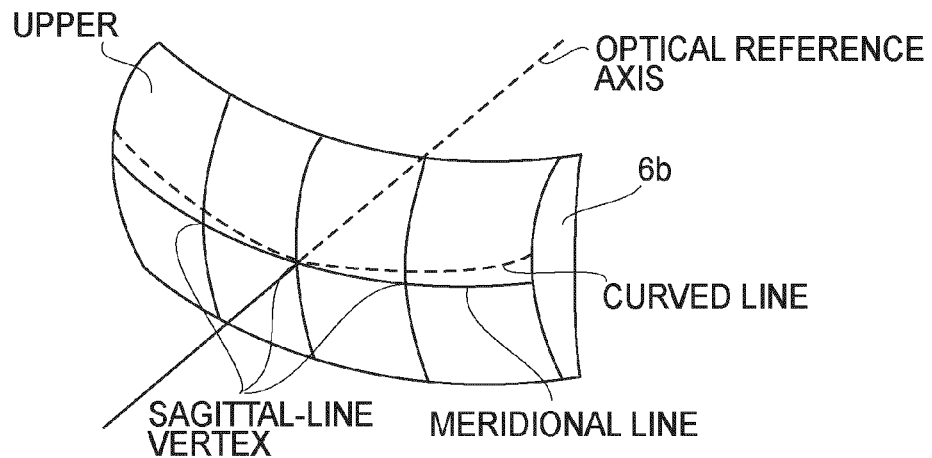
FIG. 8 is a perspective view of a main portion of a second imaging lens in the first embodiment of the present invention.

Furthermore, the shape of meridional which connects the sagittal vertexes of at least one surface of the second imaging lens 6b may be defined based on a curved line (dotted line) shown in FIG. 8 which, from the scan center of the second imaging lens 6b to the scan end portion thereof, is curved to deviate in a direction leaving from the optical reference axis CO. In that occasion, the scan line curve is reduced further.

Namely, in the main-scan section, the meridional shape (dotted line) which connects the sagittal vertexes of at least one optical surface of the second imaging lens 6b of the imaging optical system, may be based on a curved line (dotted line) which, from an axial position to an abaxial position in the main-scan direction, is curved to deviate from the optical reference axis CO, relative to a meridional shape (solid line) which is based on the curvature radius on the optical reference axis CO.

However, if the light exit surface 6b2 of the second imaging lens 6b is parallel decentered in the sub-scan direction, the following inconveniences may be caused thereby.

As shown in FIG. 5A, the angle which is defined between the principal ray Lp of the light beam incident on the light exit surface 6b2 before parallel decentration in the sub-scan direction and a surface normal D at the point of intersection of the light exit surface 6b2 with the position of impingement of the principal ray, is denoted by θ1. On the other hand, as shown in FIG. 5B, the angle which is defined between the principal ray Lp of the light beam incident on the light exit surface 6b2 after the parallel decentration in the sub-scan direction and a surface normal D at the point of intersection of the light exit surface 6b2 with the position of impingement of the principal ray, is denoted by θ2.

Here, there is a relation θ1<θ2.

If the light exit surface 6b2 is parallel decentered in the sub-scan direction, the angle which is defined between the light beam being incident on light exit surface 6b2 and the surface normal D' to the light exit surface 6b2 becomes larger than the angle which is defined between the light beam incident on the light exit surface 6b2 before the same is parallel decentered in the sub-scan direction and the surface normal D to the light exit surface 612.

Therefore, as seen from FIG. 7A, large comatic aberration is produced in the sub-scan direction, and the imaging performance on the scanned surface deteriorates remarkably.

In FIG. 7A, denoted at 4 is a cylindrical lens which has a power only in the sub-scan section.

In consideration of this, in this embodiment, as shown in FIG. 7B, an anamorphic lens 41 having a light entrance surface 41a of aspherical surface shape being asymmetric in the sub-scan section, is provided between the light source means (not shown) and the optical deflector 5. Based on this, as shown in FIG. 7B, comatic aberration in the sub-scan direction is well reduced.

As compared with the first and second imaging lenses 6a and 6b, the anamorphic lens 41 is one lens component of the input optical system LA through which a light not being scanningly deflected passes. Thus, the effective optical region thereof is narrow. Therefore, even if it has a complicated shape, molding of the same is much easier than the first and second imaging lenses 6a and 6b which are liable to be long in the main-scan direction.

Furthermore, since the anamorphic lens is a lens element having a power only in the sub-scan section, parallel decentration in the main-scan direction does not lead to deterioration of the imaging performance.

It should be noted that, although in this embodiment the light entrance surface of the anamorphic lens 41 having a power only in the sub-scan direction has an aspherical shape being asymmetric in the sub-scan section, namely, a shape having no symmetric axis, the invention is not limited to this. For example, a lens surface having a power in both of the main-scan direction and the sub-scan direction may be formed with a shape having no symmetric axis in the in sub-scan section. In that occasion, as long as accurate positioning is made with respect to both of the main-scan direction and the sub-scan direction, deterioration of the imaging performance can be avoided.

Furthermore, since the comatic aberration adjustment with respect to the sub-scan direction is carried by the input optical system LA, not by the imaging optical system LB as has been done conventionally, the imaging optical system LB can be free of this burden such that the design flexibility thereof is improved significantly. Thus, higher imaging performance is assured.

Next, the input optical system LA and the anamorphic lens (cylinder lens) 41 in the present embodiment will be explained in greater detail.

Figure 9:
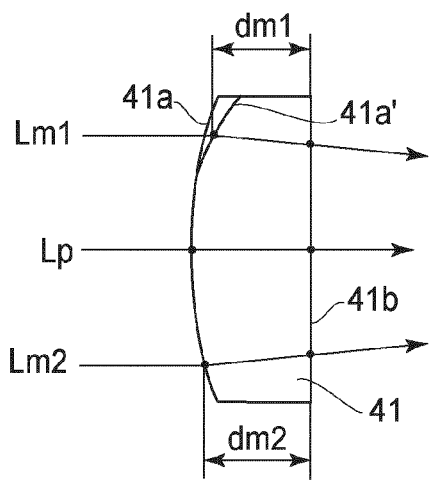
FIG. 9 is a sectional and enlarged view along the sub-scan section, of an anamorphic lens in the first embodiment of the present invention.

Table 3 below shows the data of the input optical system LA of the present embodiment. FIG. 9 is an enlarged view of a section along the sub-scan direction (sub-scan section) of a main portion of the anamorphic lens 41.

[Table 3]

TABLE 3

INPUT SYSTEM DATA

| | | |
|---|---|---|
| Collimator Lens Curvature Radius (mm) | R1 | 0 |
| | R2 | 19.2 |
| Collimator Lens Refractive Index | Ncol | 1.761666 |
| Cylinder Lens Curvature Radius (mm) | r1 | 68.8 |
| | r2 | 0 |
| Cylinder Lens Aspherical Coefficient | d4u1 | 1.0E−05 |
| | d4l1 | 0.0E+00 |
| | d4u2 | 0.0E+00 |
| | d4l2 | 0.0E+00 |
| Cylinder Lens Refractive Index | Ncyl | 1.523972 |
| Light Source to Stop Length (mm) | d1 | 21.3 |
| Stop to Collimator Lens R1 Surface Length (mm) | d2 | 2 |
| Collimator Lens R1 Surface to Collimator Lens R2 Surface Length (mm) | d3 | 3 |
| Collimator Lens R2 Surface to Cylinder Lens R1 Surface Length (mm) | d4 | 25.7 |
| Cylinder Lens R1 Surface to Cylinder Lens R2 Surface Length (mm) | d5 | 2 |
| Cylinder lens R2 Surface to Deflecting Surface Length (mm) | d6 | 130.9 |

In the present embodiment, as described above, a divergent light beam emitted from the light source means 1 is restricted (in light quantity) by the aperture stop 2, and then it is converted into parallel light by the condenser lens (collimator lens) 3. Subsequently, the parallel light beam is incident on the anamorphic lens 41. As far as the main-scan section is concerned, the parallel light beam incident on the anamorphic lens 41 goes out of it without being changed.

Within the sub-scan section, on the other hand, the light beam is converged and imaged as a line image (linear image elongating in the main-scan direction) on the deflecting surface 5a of the optical deflector 5. The light beam is incident on deflecting surface 5a of optical deflector 5 at a certain angle with respect to the sub-scan direction.

In this embodiment, the anamorphic lens 41 is made of a plastic material (resin materials). If it is made by injection molding of plastic material, a complicated shape can be made easily and the weight can be made light. However, the material is not limited to plastics, and a glass material may be used, for example.

The anamorphic lens 41 has a power at the light entrance surface 41a thereof only in the sub-scan direction, and it images the light beam passed through the condenser lens 3 as a line image on the deflecting surface 5a of the optical deflector 5, in the sub-scan section. Within the main-scan section, the light beam from the condenser lens 3 is transmitted therethrough without being changed.

The anamorphic lens 41 has a power only in the sub-scan direction as described above, and the surface (light entrance surface) 41a at which the anamorphic lens 41 has a power in the sub-scan direction is defined by a surface 41a' which has an aspherical surface shape being asymmetric in the sub-scan section.

In other words, between the light source means 1 and the optical deflector 5, there is provided an anamorphic lens 41 having at least one surface which has no symmetric axis within the sub-scan section and, by doing so, comatic aberration in the sub-scan direction which results from parallel decentration of the second imaging lens 6b in the sub-scan direction is cancelled.

It should be noted that the light exit surface 41b of the anamorphic lens 41 has a flat shape in the main-scan section and the sub-scan section, and thus it has no power in the main-scan section and the sub-scan section.

Figure 10:
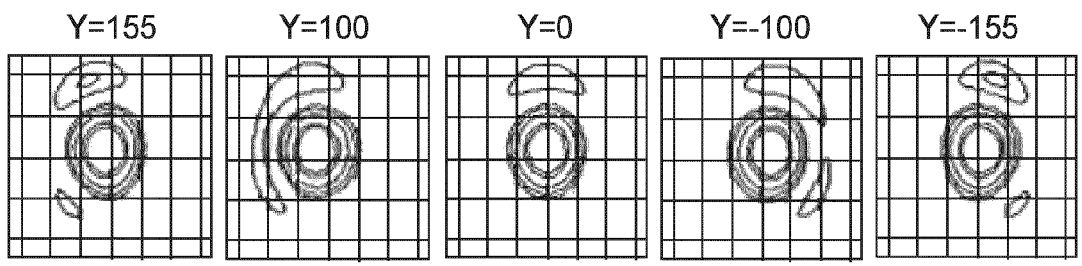
FIG. 10 is a diagram which shows a conventional spot shape.
Figure 10:
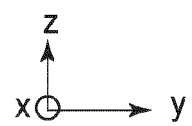

FIG. 10 is a sectional diagram of spot shape by a conventional optical scanning device, from an axial position to a most abaxial position on the scanned surface, in a case where the light entrance surface of an anamorphic lens has a symmetrical arcuate shape (arcuate shape being symmetric with respect to the optical axis of the anamorphic lens) in the sub-scan section.

Figure 11:
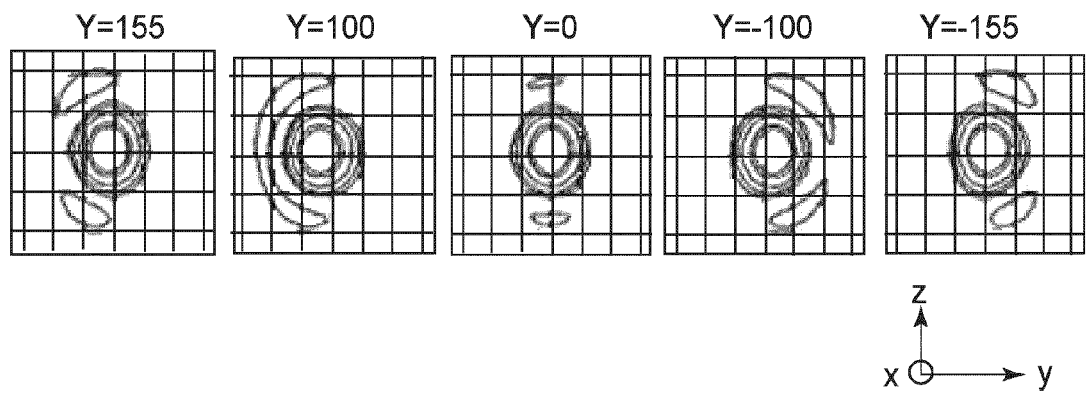
FIG. 11 is a diagram which shows a spot shape in the first embodiment of the present invention.

FIG. 11 is a sectional diagram of spot shape by an optical scanning device of this embodiment, from an axial position to a most abaxial position on the scanned surface, in a case where the light entrance surface 41a' of the anamorphic lens 41 has an asymmetrical aspherical shape in the sub-scan section.

In FIG. 10 and FIG. 11, the spot shapes are illustrated by six contours based on 2%, 5%, 10%, 13.5%, 36.8% and 50% of the peak light quantity. Denoted at Y is the image height.

FIG. 10 shows a sectional view of the spot shape from an axial position to a most abaxial position in a case where the light entrance surface of the anamorphic lens has a symmetric arcuate shape in the sub-scan section. It is seen that the side lobe of the spot is asymmetric in the sub-scan direction with respect to the spot center. Because of this asymmetric spot shape, a side lobe of 5% of the peak light quantity appears at an upper portion of the spot.

In consideration of this, in the present embodiment, the light entrance surface 41a' of the anamorphic lens 41 is defined by an aspherical surface shape which is asymmetric in the sub-scan section. Based on this, as shown in FIG. 11, the side lobe of 5% of the peak light quantity at the upper spot porting has disappeared, and a symmetric side lobe about the spot center is obtained. Namely, it is seen that comatic aberration in the sub-scan direction has been improved significantly.

The shape of the light entrance surface 41a' of the anamorphic lens 41 in the present embodiment is expressed by the following shape expression.

If the point of intersection with the optical axis is taken as an origin, the optical axis is taken as X-axis, and an axis orthogonal to the optical axis in the sub-scan section is taken as Z-axis, then in the sagittal direction corresponding to the sub-scan direction, it follows that:

$$X = \frac{Z^2/r}{1 + (1 - (1+K)(Z/r)^2)^{1/2}} + d_4 Z^4 \qquad (c)$$

where r is the sagittal curvature radius on the optical axis, and K and d4 are aspherical coefficients.

Although the multinomial in the shape expression is expressed by a function up to the fourth order, the order may be higher or lower than this.

Here, the aspherical coefficients d4u1 and d4u2 are coefficients which specify the shape of the lens surface in the sub-scan section at one side of the optical axis close to the optical reference axis C0. The aspherical coefficients d4l1 and d4l2 are coefficients which specify the shape of the lens surface in the sub-scan section at the other side of the optical axis.

As shown in Table 3, with regard to the light entrance surface of the anamorphic lens 41, although the aspherical coefficient d4u1 is equal to 1.0E−5, the aspherical coefficient d4l1 is equal to zero. In other words, the shape of the anamorphic lens 41 in the sub-scan section is specified by different aspherical coefficients at the opposite sides of the optical axis, wherein one has a finite value while the other is equal to zero. Namely, the aspherical coefficient at the optical reference axis C0 side of the optical axis has a finite value, and the aspherical coefficient at the other side of the optical axis remote from the optical reference axis C0 is equal to zero.

The aspherical coefficient at a side of the principal ray of the light beam passing through the anamorphic lens 41, which side is close to the optical reference axis C0, has a finite value, whereas the aspherical coefficient at the other side of the principal ray of the light beam passing through the anamorphic lens 41, which side is remote from the optical reference axis C0, is equal to zero.

It is seen from this that the shape of the lens surface within the effective diameter, in the sub-scan section, is asymmetric from the axial position to an off position in the sub-scan direction, with respect to the optical axis.

In the present embodiment, if the thickness of the anamorphic lens 41 at a position where, in the sub-scan section, a first marginal light ray at a side of the principal ray of the light beam among those beams passing through the anamorphic lens 41, which side is close to the optical reference axis C0, passes is denoted by dm1 (mm), and if the thickness thereof at a position where a second marginal ray at a side of the principal ray of the light beam remote from the optical reference axis C0, passes is denoted by dm2 (mm), then the following condition is satisfied.

$$dm1 < dm2 \qquad (1)$$

Conditional expression (1) specifies the order in size of the thickness dm1 at the first marginal light ray position on the optical reference axis C0 side, and the other thickness dm2 at the second marginal light ray position. If conditional expression (1) is unsatisfied (the sign is reversed), comatic aberration in the sub-scan direction deteriorates.

In this embodiment, by satisfying conditional expression (1), comatic aberration in the sub-scan direction resulting from parallel decentration of the light exit surface 6b2 of the second imaging lens 6b in the sub-scan direction, is cancelled.

Specifically, the thicknesses dm1 and dm2 in the present embodiment are as follows.

dm1=1.957771 mm and dm2=1.958103 mm.

This satisfies conditional expression (1).

In the present first embodiment, the light exit surface 6b2 (lens surface) of the imaging lens 6b is translationally decentered to ensure that the angle which is defined between the surface normal and the principal ray meets the relation θ1<θ2. However, the relation θ1<θ2 can be accomplished by rotationally decentering the lens surface of the imaging lens 6b clockwise about an axis parallel to the main-scan direction.

Therefore, the present invention may take a form that the light exit surface 6b2 (lens surface) of the imaging lens may be rotationally decentered.

[Color Image Forming Apparatus]

Figure 12:
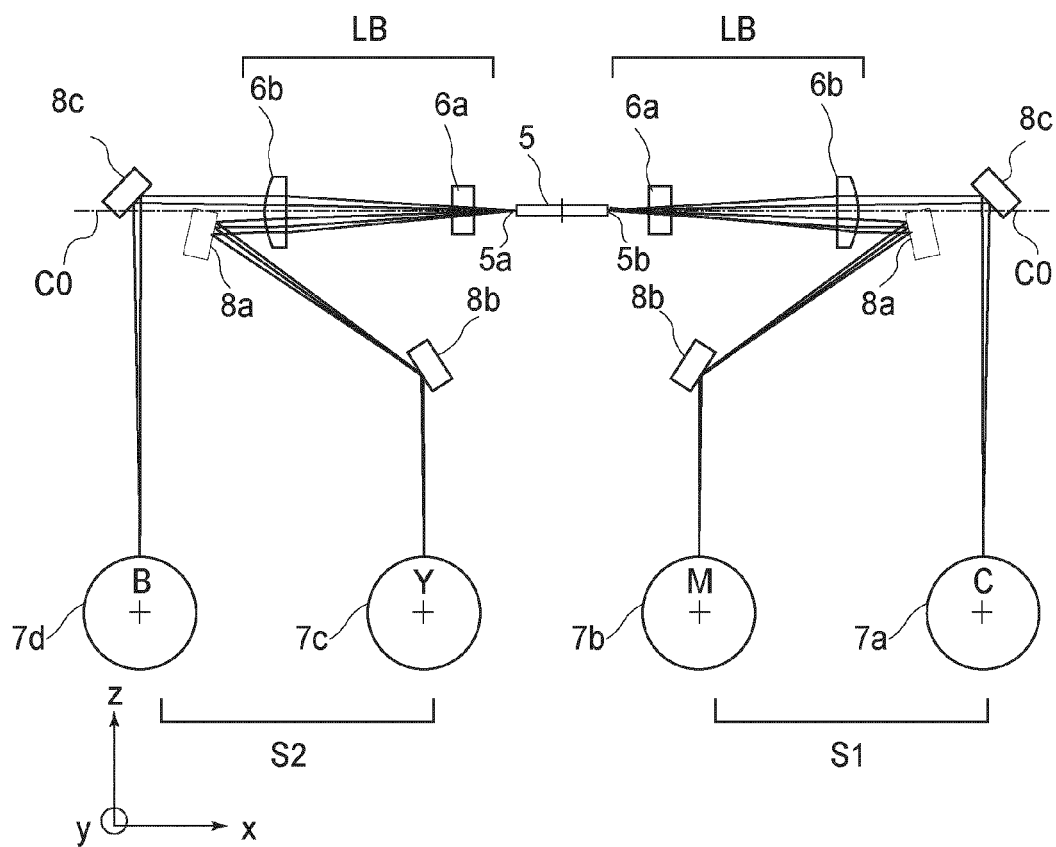
FIG. 12 is a schematic view of a structure when an optical scanning device of the first embodiment of the present invention is incorporated into a color image forming apparatus.

FIG. 12 is a sub-scan sectional view of a color image forming apparatus which comprises four optical scanning devices according to the present embodiment described above. In FIG. 12, like numerals are assigned to components corresponding to those of FIG. 1.

In FIG. 12, the optical scanning devices described hereinbefore are disposed symmetrically in pairs about the rotational axis of the optical deflector 5, to constitute a color image forming apparatus of four colors (C, M, Y and B).

On the other hand, the optical deflector 5 is shared. The first and second imaging lenses 6a and 6b may be integrally molded at each of the stations S1 and S2, as shown in FIG. 12. In that occasion, the integrally molded second imaging lens 6b may be decentered.

In the sub-scan section, four light beams emitted from four light source means (not shown) are obliquely incident, at an oblique incidence angle θs, on different deflecting surfaces 5a and 5b of the optical deflector 5, from obliquely above and obliquely blow of the optical reference axis C0.

Then the light beams incident on the deflecting surfaces 5a and 5b from obliquely above are reflected downwardly, while the light beams incident thereon from obliquely below are reflected upwardly. Then, the light paths are separated by reflecting mirrors 8a, 8b and 8c corresponding to the imaging optical system LB.

Subsequently, the four divided light beams are directed onto corresponding photosensitive drum surfaces (C, M, Y and B) 7a, 7b, 7c and 7d. Based on this, a color image is produced.

Since two stations S1 and S2 have the same optical function, the following description will be made on the station S1 only.

In the color image forming apparatus shown in FIG. 12, if the imaging magnification (sub-scan magnification) of the imaging optical system LB in the sub-scan section is denoted by βs, then the following condition is satisfied.

$$1.0 \leq |\beta s| \leq 3.0 \quad (2)$$

Conditional expression (2) specifies the imaging magnification βs of the imaging optical system LB in the sub-scan section. If the upper limit of conditional expression (2) is exceeded, the second imaging lens 6b becomes too close to the optical deflector 5, and the oblique incidence angle in the sub-scan direction has to be inconveniently made large in order to separate the upper and lower light beams upon the second imaging lens 6b surface.

Furthermore, it becomes difficult to reduce the scan line curve and the torsion (spot rotation) of the wavefront aberration.

On the other hand, if the lower limit of conditional expression (2) is exceeded, the second imaging lens 6b becomes too close to the scanned surface 7a or 7b, and the second imaging lens 6b has to be prolonged in the main-scan direction. Then, in the injection molding of the imaging lens, the number of lenses to be molded at the same time becomes too small.

The imaging magnification βs of the imaging optical system LB of the present embodiment, in the sub-scan section, is $$|\beta s| = 2.09$$

and this satisfies conditional expression (2).

More preferably, conditional expression (2) had better be set as follows.

$$1.5 \leq |\beta s| \leq 2.5 \quad (2a)$$

Furthermore, in the color image forming apparatus shown in FIG. 12, in sub-scan section, if the oblique incidence angle of the principal ray of the light beam from the input optical system (not shown) LA onto the deflecting surface 5a is denoted by θs (deg), the following condition is satisfied.

$$1.0(\deg) \leq \theta s \leq 5.0(\deg) \quad (3)$$

Conditional expression (3) specifies the oblique incidence angle θs of the principal ray of the light beam from the input optical system LA, onto the deflecting surface 5a. If the upper limit of conditional expression (3) is exceeded, the oblique incidence angle in the sub-scan direction becomes too large, and it is difficult to reduce the scan line curve and the torsion (spot rotation) of the wavefront aberration.

If on the other hand the lower limit of conditional expression (3) is exceeded, a plurality of light beams (two in the present embodiment) which are incident on the same deflecting surface of the optical deflector at different angles and which are to be deflected thereby, cannot be separated from each other with respect to the vertical direction.

The oblique incidence angle θs in the present embodiment is $$\theta s = 1.8 \text{ deg.}$$

This satisfies conditional expression (3).

More preferably, conditional expression (3) had better be set as follows.

$$1.5(\deg) \leq \theta s \leq 4.5(\deg) \quad (3a)$$

Thus, in accordance with the present embodiment described above, a compact optical scanning device which can be incorporated into a color image forming apparatus of four colors (C, M, Y, and B) is accomplished.

As described hereinbefore, the first and second imaging lenses 6a and 6b are integrally molded in each station S1 or S2 as shown in FIG. 12. Based on this, in the present embodiment, the overall system is compactified and simplified.

In accordance with the present embodiment as described above, both of the scan line curve and comatic aberration in the sub-scan direction can be well adjusted with a simple structure described above.

Based on this, in accordance with the present embodiment, an optical scanning device and a color image forming of compact structure by which, when applied into a color LBP or color copying machine, high quality images free from image performance degradation such as color misregistration can be produced, are accomplished.

[Embodiment 2]

FIG. 13 is a sectional view along a sub-scan direction (sub-scan sectional plane) of a main portion of an optical scanning device according to a second embodiment, from light source means 1 to an optical deflector 5.

FIG. 14 is a sectional view along a sub-scan direction (sub-scan sectional plane) of an anamorphic lens 42 according to the second embodiment.

In FIG. 13 and FIG. 14, like numerals are assigned to components corresponding to those of FIG. 2 and FIG. 9.

The present embodiment differs from the abovementioned first embodiment in that, within the sub-scan section, the light entrance surface 42a' of the anamorphic lens 42 is defined by different aspherical surface shapes, at one side of the optical axis of the light entrance surface 42a' which side is close to the optical reference axis C0 and at the other side of the optical axis remote from the optical reference axis C), respectively.

Other structures and optical functions are similar to the first embodiment and, based on this, similar advantageous effects are obtainable.

More specifically, denoted in these drawings at 42 is an anamorphic lens. Within the sub-scan section, those portions of the light entrance surface 42a' of the anamorphic lens 42 one of which is at a side of the optical axis thereof close to the optical reference axis C0 and the other one of which is at a side of the optical axis remote from the optical reference axis C0, are defined by different aspherical surface shapes (non-arcuate shapes), respectively.

In other words, within the sub-scan section, a portion of the light entrance surface 42a' of the anamorphic lens 42 at a side of the principal ray of the light beam close to the optical reference axis C0 and a portion of the light entrance surface 42a' of the anamorphic lens 42 at a side of the principal ray of the light beam remote from the optical reference axis C0, are defined by different aspherical surface shapes, respectively.

With this arrangement, in this embodiment, comatic aberration in the sub-scan direction resulting from translational decentration (shift) of the light exit surface 6b2 of the second imaging lens 6b in the sub-scan section, relative to the optical reference axis C0 and toward the same side as the light passes, can be well adjusted.

In the present second embodiment, the light exit surface 6b2 (lens surface) of the imaging lens 6b is translationally decentered to ensure that the angle which is defined between the surface normal and the principal ray meets the relation θ1<θ2. However, the relation θ1<θ2 can be accomplished by rotationally decentering the lens surface of the imaging lens 6b clockwise about an axis parallel to the main-scan direction.

Therefore, the present invention may take a form that the light exit surface 6b2 (lens surface) of the imaging lens may be rotationally decentered.

In FIG. 14, denoted at 42a is a light entrance surface which comprises a symmetric and aspherical surface shape (an aspherical surface shape being symmetric with respect to the optical axis), this being illustrated as a comparative example.

Table 4 below shows the optical disposition of the input optical system LA in the present embodiment.

[Table 4]

TABLE 4

| INPUT SYSTEM DATA | | |
|---|---|---|
| Collimator Lens Curvature Radius (mm) | R1 | 0 |
| | R2 | 19.2 |
| Collimator Lens Refractive Index | Ncol | 1.761666 |
| Cylinder Lens Curvature Radius (mm) | r1 | 68.8 |
| | r2 | 0 |
| Cylinder Lens Aspherical Coefficient | d4u1 | 5.3E−06 |
| | d4l1 | −5.3E−06 |
| | d4u2 | 0.0E+00 |
| | d4l2 | 0.0E+00 |
| Cylinder Lens Refractive Index | Ncyl | 1.523972 |
| Light Source to Stop Length (mm) | d1 | 21.3 |
| Stop to Collimator Lens R1 Surface Length (mm) | d2 | 2 |

TABLE 4-continued

| INPUT SYSTEM DATA | | |
|---|---|---|
| Collimator Lens R1 Surface to Collimator Lens R2 Surface Length (mm) | d3 | 3 |
| Collimator Lens R2 Surface to Cylinder Lens R1 Surface Length (mm) | d4 | 25.7 |
| Cylinder Lens R1 Surface to Cylinder Lens R2 Surface Length (mm) | d5 | 2 |
| Cylinder lens R2 Surface to Deflecting Surface Length (mm) | d6 | 130.9 |

As shown in Table 4, with regard to the light entrance surface 42a' of the anamorphic lens (cylinder lens) 42, although the aspherical coefficient $d4u1$ is equal to 5.3E−6, the aspherical coefficient $d4l1$ is equal to −5.3E−6. In other words, the shape of the anamorphic lens 42 in the sub-scan section is specified by aspherical coefficients of different signs, at the opposite sides of the optical axis.

It is seen from this that the shape of the lens surface within the effective diameter, in the sub-scan section, is asymmetric from the axial position to an off position in the sub-scan direction, with respect to the optical axis.

FIG. 15 is a sectional diagram of spot shape by an optical scanning device of this embodiment, from an axial position to a most abaxial position on the scanned surface. In FIG. 15, the spot shapes are illustrated by six contours based on 2%, 5%, 10%, 13.5%, 36.8% and 50% of the peak light quantity. Denoted at Y is the image height.

As shown in FIG. 15, the side lobe of the spot is symmetric toward the sub-scan direction with respect to the spot center, and the side lobe at the spot upper portion appears only up to 2% of the peak light quantity. Thus, it is seen that comatic aberration in the sub-scan direction has been improved.

In the present embodiment, the thickness dm1 at a position where the marginal light ray Lm1 on the optical reference axis C0 side passes and the thickness dm2 at the position where the other marginal light ray Lm2 passes, are:

$$dm1 = 1.957927 \text{ mm and}$$

$$dm2 = 1.958279 \text{ mm}.$$

This satisfies conditional expression (1).

Furthermore, the imaging magnification βs of the imaging optical system LB in the sub-scan section when an optical scanning device of the present embodiment is incorporated into a color image forming apparatus shown in FIG. 12, like the first embodiment, is:

$$|\beta s| = 2.09$$

and this satisfies conditional expression (2).

Furthermore, when an optical scanning device according to the present embodiment is incorporated into a color image forming apparatus shown in FIG. 12, like the first embodiment described hereinbefore, the oblique incidence angle θs of the principal ray of the light beam on the deflecting surface 5a of the optical deflector 5 is:

$$\theta s = 1.8 \text{ deg}.$$

This satisfies conditional expression (3).

In accordance with the present embodiment as described above, the light entrance surface 42a' of the anamorphic lens 42 is defined by an asymmetrical aspherical surface shape and, based on this, comatic aberration in the sub-scan direction which results from shifting the light exit surface 6b2 of the second imaging lens 6b in the sub-scan section, can be well adjusted.

Based on this, in accordance with the present embodiment, an optical scanning device and a color image forming of compact structure by which, when applied into a color LBP or color copying machine, high quality images free from image performance degradation such as color misregistration can be produced, are accomplished.

[Embodiment 3]

Figure 16:
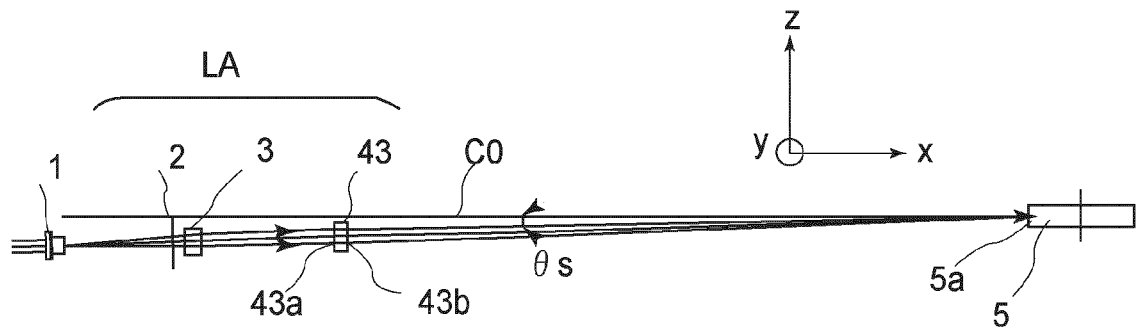
FIG. 16 is a sectional view along a sub-scan section, of an optical scanning device according to a third embodiment of the present invention, from light source means of an optical deflector.

FIG. 16 is a sectional view along a sub-scan direction (sub-scan sectional plane) of a main portion of an optical scanning device according to a third embodiment, from light source means to an optical deflector.

Figure 17:
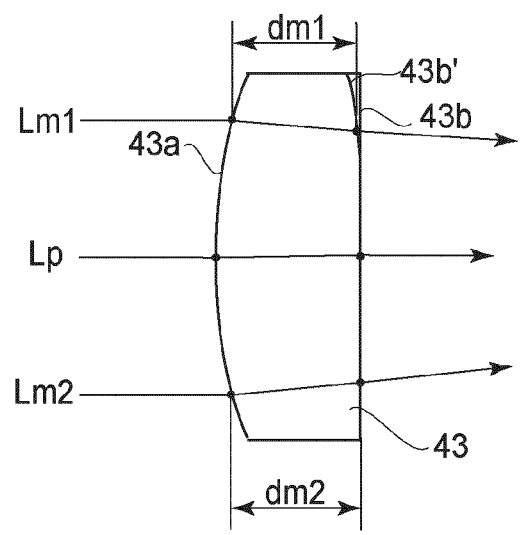
FIG. 17 is a sectional and enlarged view along a sub-scan section, of an anamorphic lens of the third embodiment of the present invention.

FIG. 17 is a sectional view along a sub-scan direction (sub-scan sectional plane) of an anamorphic lens 43 according to the third embodiment.

In FIG. 16 and FIG. 17, like numerals are assigned to components corresponding to those of FIG. 2 and FIG. 8.

This embodiment differs from the first and second embodiments described hereinbefore in that, in the sub-scan section, the surface portion of the light exit surface 43b' of an anamorphic lens 43, which is at a side of the optical axis of the light exit surface 43b' close to the optical reference C0 is defined by an aspherical surface shape.

Other structures and optical function are similar to the first embodiment, and based on this, similar advantageous effects are obtainable.

More specifically, denoted in the drawing at 43 is an anamorphic lens. In the sub-scan section, the surface portion of the light exit surface 43b' of the lens 43 which is at a side of the optical axis of the light exit surface 43b' facing the optical reference C0, is defined by an aspherical surface shape.

In other words, the portion of the light exit surface 43b' of the anamorphic lens 43 which is at a side of the principal ray of the light beam close to the optical reference axis C0, is defined by an aspherical surface shape.

With this arrangement, in this embodiment, comatic aberration in the sub-scan direction resulting from translational decentration (shift) of the light exit surface 6b2 of second imaging lens 6b in the sub-scan section relative to the optical reference axis C0, toward the same side as the light passes, can be well adjusted.

In FIG. 17, denoted at 43b is a light entrance surface which comprises an aspherical surface shape being symmetric with respect to the optical axis), this being illustrated as a comparative example.

Table 5 below shows the optics disposition of the input optical system LA in the present embodiment.

[Table 5]

TABLE 5

| INPUT SYSTEM DATA | | |
|---|---|---|
| Collimator Lens Curvature Radius (mm) | R1 | 0 |
|  | R2 | 19.2 |
| Collimator Lens Refractive Index | Ncol | 1.761666 |
| Cylinder Lens Curvature Radius (mm) | r1 | 68.8 |
|  | r2 | 0 |
| Cylinder Lens Aspherical Coefficient | d4u1 | 0.0E+00 |
|  | d4l1 | 0.0E+00 |
|  | d4u2 | −1.1E−05 |
|  | d4l2 | 0.0E+00 |
| Cylinder Lens Refractive Index | Ncyl | 1.523972 |
| Light Source to Stop Length (mm) | d1 | 21.3 |
| Stop to Collimator Lens R1 Surface Length (mm) | d2 | 2 |
| Collimator Lens R1 Surface to Collimator Lens R2 Surface Length (mm) | d3 | 3 |
| Collimator Lens R2 Surface to Cylinder Lens R1 Surface Length (mm) | d4 | 25.7 |
| Cylinder Lens R1 Surface to Cylinder Lens R2 Surface Length (mm) | d5 | 2 |
| Cylinder lens R2 Surface to Deflecting Surface Length (mm) | d6 | 130.9 |

As shown in Table 5, with regard to the light exit surface 43b' of the anamorphic lens (cylinder lens) 43, although the aspherical coefficient d4u2 is equal to −1.1E−5, the aspherical coefficient d4l2 is equal to zero. In other words, the shape of the anamorphic lens 43 in the sub-scan section is specified by different aspherical coefficients at the opposite sides of the optical axis, wherein one has a finite value while the other is equal to zero. Namely, the aspherical coefficient at the optical reference axis C0 side of the optical axis has a finite value, and the aspherical coefficient at the other side of the optical axis remote from the optical reference axis C0 is equal to zero.

It is seen from this that the shape of the lens surface within the effective diameter, in the sub-scan section, is asymmetric from the axial position to an off position in the sub-scan direction, with respect to the optical axis.

Figure 18:
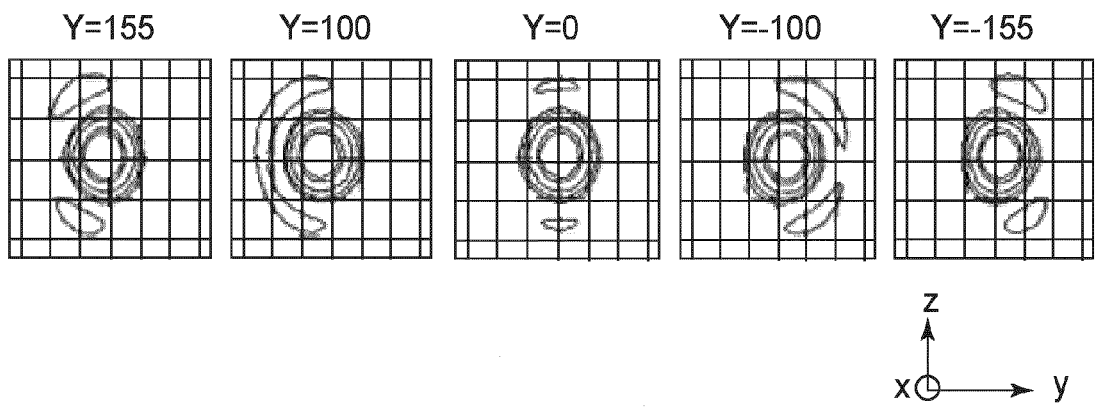
FIG. 18 is a diagram which shows a spot shape in the third embodiment of the present invention.

FIG. 18 is a sectional diagram of spot shape by an optical scanning device of this embodiment, from an axial position to a most abaxial position on the scanned surface. In FIG. 18, the spot shapes are illustrated by six contours based on 2%, 5%, 10%, 13.5%, 36.8% and 50% of the peak light quantity. Denoted at Y is the image height.

As shown in FIG. 18, the side lobe of the spot is symmetric toward the sub-scan direction with respect to the spot center, and the side lobe at the spot upper portion appears only up to 2% of the peak light quantity. Thus, it is seen that comatic aberration in the sub-scan direction has been improved.

In the present embodiment, the thickness dm1 at a position where the marginal light ray Lm1 on the optical reference axis C0 side passes and the thickness dm2 at the position where the other marginal light ray Lm2 passes, are:

dm1=1.957752 mm and dm2=1.958103 mm.

This satisfies conditional expression (1).

Furthermore, the imaging magnification βs of the imaging optical system LB in the sub-scan section when an optical scanning device of the present embodiment is incorporated into a color image forming apparatus shown in FIG. 12, like the first embodiment, is:

|βs|=2.09 and this satisfies conditional expression (2).

Furthermore, when an optical scanning device according to the present embodiment is incorporated into a color image forming apparatus shown in FIG. 12, like the first embodiment described hereinbefore, the oblique incidence angle θs of the principal ray of the light beam on the deflecting surface 5a of the optical deflector 5 is:

θs=1.8 deg.

This satisfies conditional expression (3).

In accordance with the present embodiment as described above, the light exit surface 43b' of the anamorphic lens 43 is defined by an asymmetrical aspherical surface shape and, based on this, comatic aberration in the sub-scan direction which results from parallel decentering (shifting) the light exit surface 6b2 of the second imaging lens 6b in the sub-scan section, can be well adjusted.

In the present third embodiment, the light exit surface 6b2 (lens surface) of the imaging lens 6b is translationally decentered to ensure that the angle which is defined between the surface normal and the principal ray meets the relation $\theta1<\theta2$. However, the relation $\theta1<\theta2$ can be accomplished by rotationally decentering the lens surface of the imaging lens 6b clockwise about an axis parallel to the main-scan direction.

Therefore, the present invention may take a form that the light exit surface 6b2 (lens surface) of the imaging lens may be rotationally decentered.

Based on this, in accordance with the present embodiment, an optical scanning device and a color image forming of compact structure by which, when applied into a color LBP or color copying machine, high quality images free from image performance degradation such as color misregistration can be produced, are accomplished.

[Embodiment of Image Forming Apparatus]

Figure 19:
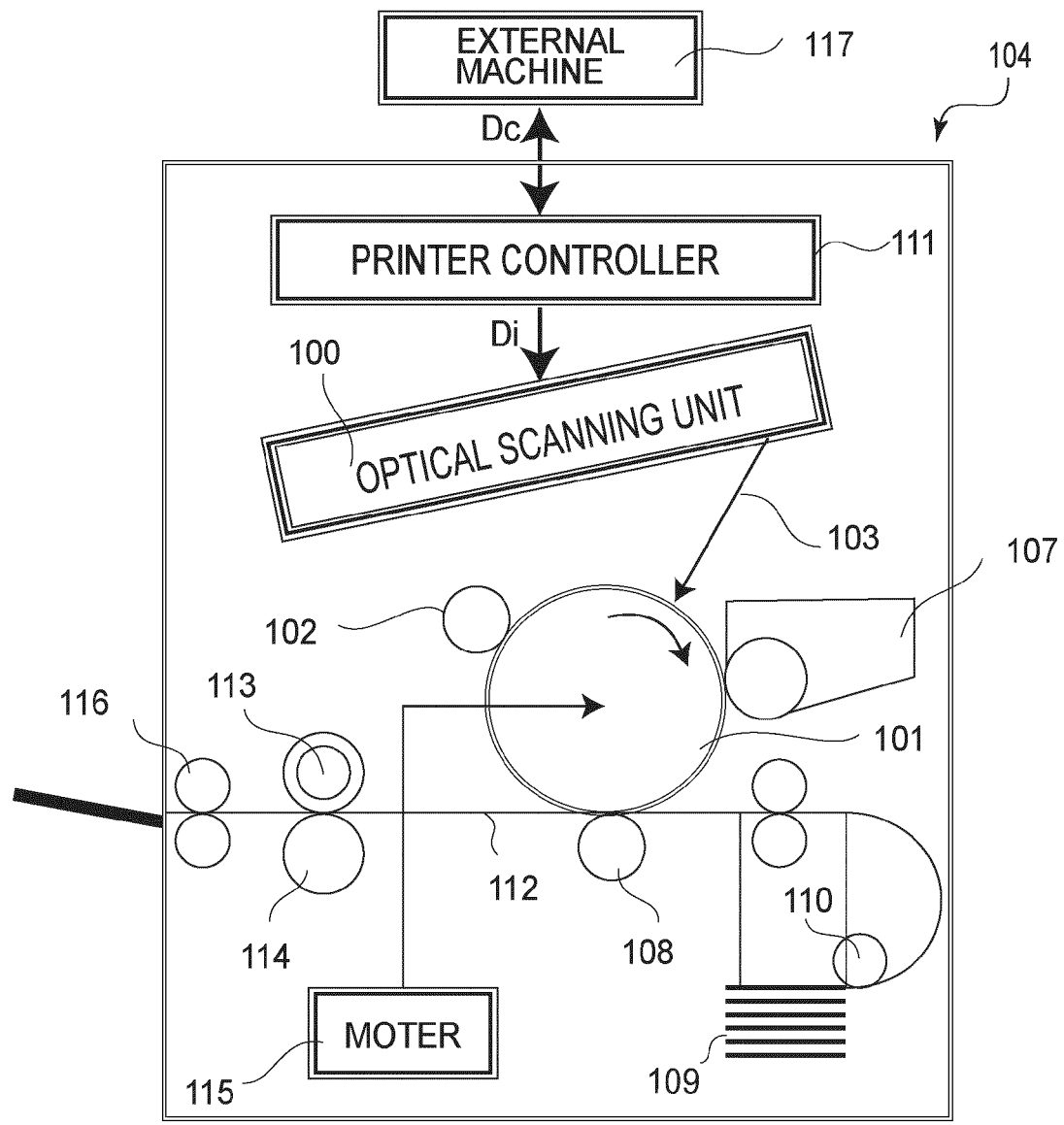
FIG. 19 is a sectional view along a sub-scan section, which shows an embodiment of image forming apparatus of the present invention.

FIG. 19 is a schematic and sectional view, in the sub-scan direction, of a main portion of an image forming apparatus according to an embodiment of the present invention. Denoted generally at 104 in the drawing is the image forming apparatus.

The image forming apparatus 104 receives code data Dc supplied thereto from an external machine 117 such as a personal computer, for example. The code data Dc is then transformed by a printer controller 111 inside the apparatus, into imagewise data (dot data) Di.

The imagewise data Di is then inputted into an optical scanning unit 100 which is configured in accordance with any one of the preceding embodiments described hereinbefore. The optical scanning unit 100 produces a light beam 103 having been modulated in accordance with the imagewise data Di, and with this light beam 103, the photosensitive surface of a photosensitive drum 101 is scanned in the main-scan direction.

The photosensitive drum 101 which is an electrostatic latent image bearing member (photosensitive member) is rotated clockwise by means of a motor 115. Through this rotation, the photosensitive surface of the photosensitive drum 101 is moved relatively to the light beam 103, in the sub-scan direction which is orthogonal to the main-scan direction.

Disposed just above the photosensitive drum 101 is a charging roller 102 which is in contact with the photosensitive drum surface to electrically charge the drum surface uniformly. Onto the photosensitive drum 101 surface having been electrically charged by the charging roller 102, the light beam 103 being scanned by the optical scanning unit 100 is projected.

As described above, the light beam 103 has been modulated in accordance with the imagewise data Di. By irradiating the photosensitive drum 101 with this light beam 103, an electrostatic latent image is formed on the photosensitive drum 101 surface. The electrostatic latent image thus formed is then developed into a toner image, by means of a developing device 107 which is provided at a position downstream of the irradiation position of the light beam 103 with respect to the rotational direction of the photosensitive drum 101 and which is in contact with the photosensitive drum 101.

The toner image thus developed by the developing device 107 is transferred onto a transfer sheet (transfer material) 112 below the photosensitive drum 101, by means of a transfer roller 108 which is disposed opposed to the photosensitive drum 101.

Transfer sheets 112 are stored in a sheet cassette 109 in front of (at the right-hand side as viewed in FIG. 19) the photosensitive drum, but these can be supplied manually. There is a sheet supplying roller 110 at an end portion of the sheet cassette 109, for supplying each sheet 112 in the cassette 109 into a sheet supply path.

The paper sheet 112 having an unfixed toner image transferred thereto in the manner described above is conveyed to a fixing device behind (at the left-hand side as viewed in FIG. 19) the photosensitive drum 101. The fixing device comprises a fixing roller 113 having a built-in fixing heater (not shown) and a pressing roller 114 disposed to be press-contacted to the fixing roller 113. The transfer sheet 112 supplied from the image transfer station is heated under pressure at the press contact area between the fixing roller 113 and the pressing roller 114, whereby the unfixed toner image on the transfer sheet 112 is fixed thereon.

Behind the fixing roller 113, there are sheet discharging rollers 116 which function to discharge the image-fixed sheet 112 out of the image forming apparatus.

While not shown in FIG. 19, the print controller 111 has various functions in addition to the data conversion function described hereinbefore, such as for controlling a motor 115 or any other components inside the image forming apparatus as well as a polygon motor inside the optical scanning unit (to be described later).

There is no particular limitation with regard to the recording density of the image forming apparatus to be used in the present invention. However, since the higher the recording density is, the higher the required image quality is, the structures according to the first and second embodiments of the present invention will be more effective when they are introduced into an image forming apparatus of a resolution 1200 dpi or higher.

[Embodiment of Color Image Forming Apparatus]

Figure 20:
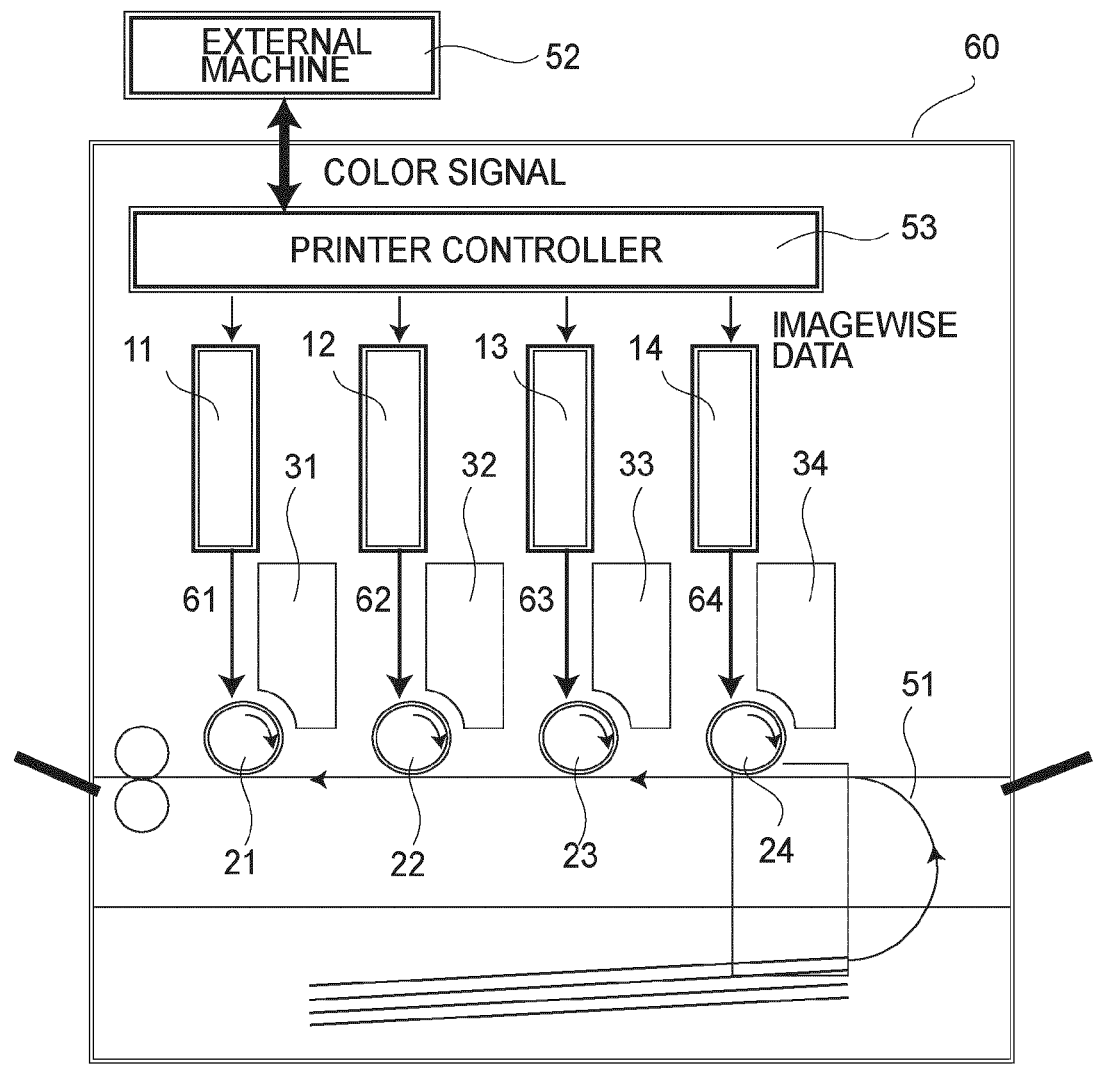
FIG. 20 is a schematic diagram of a main portion of a color image forming apparatus in an embodiment of the present invention.
Figure 21:
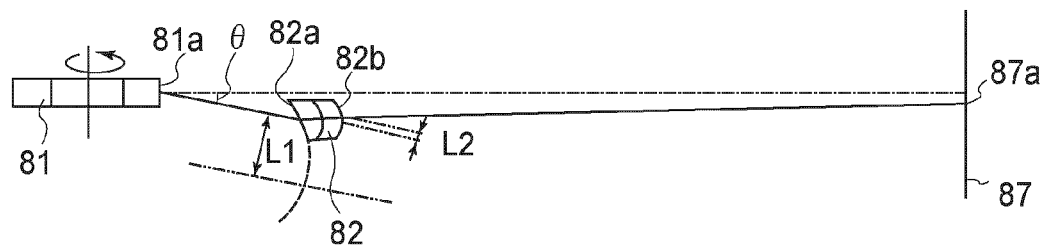
FIG. 21 is a sectional view along a sub-scan section, of a conventional optical scanning device.
Figure 22:
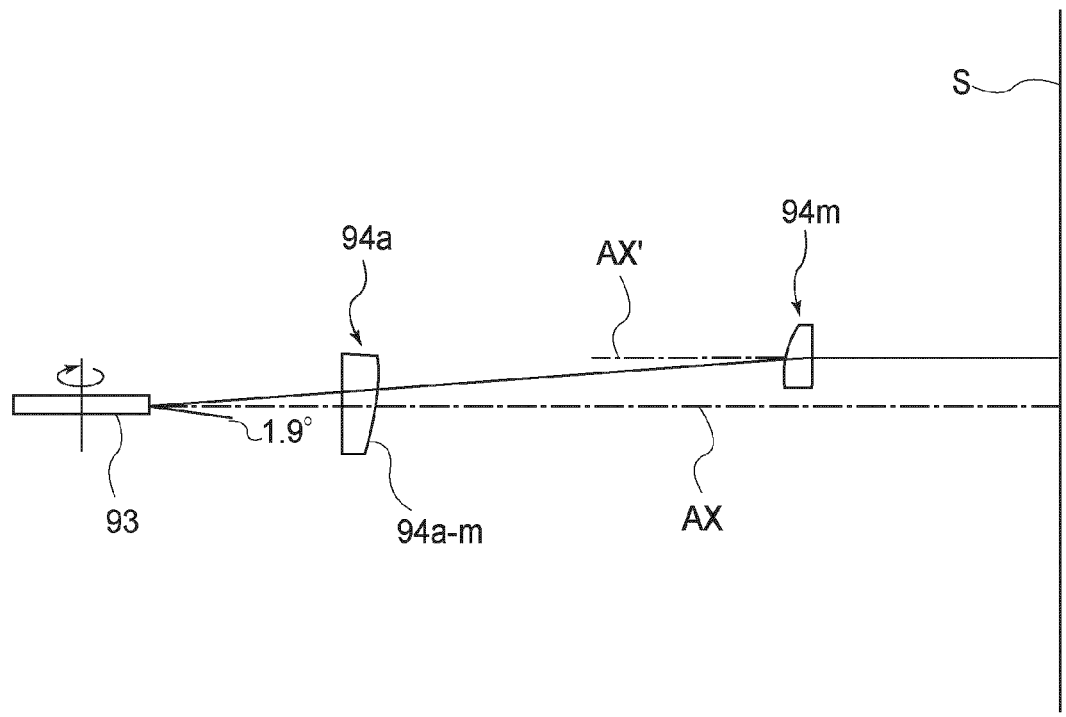
FIG. 22 is sectional view along a sub-scan section, of a conventional optical scanning device.

FIG. 20 is a schematic view of a main portion of a color image forming apparatus according to an embodiment of the present invention. This embodiment is directed to a tandem type color image forming apparatus in which four optical scanning devices are provided so as to record imagewise data upon the surfaces of corresponding photosensitive drums (image bearing members) in parallel to each other.

In FIG. 20, denoted generally at 60 is a color image forming apparatus, and denoted at 11, 12, 13 and 14 are optical scanning devices having a structure according to any one of the preceding embodiments. Denoted at 21, 22, 23 and 24 are photosensitive drums (image bearing members), and denoted at 31, 32, 33 and 34 are developing devices, respectively. Denoted at 51 is a conveyance belt.

Although not shown in FIG. 20, the image forming apparatus further comprises a transfer device for transferring the toner image developed by the developing device to a transfer material, and a fixing device for fixing the transferred toner image on the transfer sheet.

In FIG. 20, the color image forming apparatus 60 receives color signals of R (red), G (green) and B (blue) supplied thereto from an outside machine 52 such as a personal computer, for example. These color signals are transformed by means of a printer controller 53 inside the image forming apparatus, into imagewise data (dot data) corresponding to C (cyan), M (magenta), Y (yellow) and B (black).

These imagewise data are inputted into the optical scanning devices 11, 12, 13 and 14, respectively. In response, these optical scanning devices produce light beams 61, 62, 63 and 64 having been modulated in accordance with the associated imagewise data. Through these light beams, the photosensitive surfaces of the photosensitive drums 21, 22, 23 and 24 are scanned in the main-scan direction.

In the color image forming apparatus of this embodiment, four optical scanning devices 11, 12, 13 and 14 are provided and these correspond to colors of C (cyan), M (magenta), Y (yellow) and B (black), respectively. These scanning devices are operable in parallel to each other to record imagewise signals upon the surfaces of the photosensitive drums 21, 22, 23 and 24, respectively, so that a color image can be printed at high speed.

As described, the color image forming apparatus of this embodiment uses four optical scanning devices 11, 12, 13 and 14 to produce latent images for different colors upon the surfaces of corresponding photosensitive drums 21, 22, 23 and 24, respectively, by use of light beams based on respective image data. After that, these images are superposedly transferred onto a recording sheet, whereby a single full-color image is produced thereon.

As regards the outside machine 52, a color image reading machine having a CCD sensor, for example, may be used. In that occasion, this color image reading machine and the color image forming apparatus 60 will provide a color digital copying machine.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2007-000872 filed Jan. 6, 2007, for which is hereby incorporated by reference.

What is claimed is:

1. An optical scanning device, comprising:
light source means;
an optical deflector having a deflecting surface;
an incident optical system having an incident optical element and being configured to project a light beam emitted from said light source means onto the deflecting surface of said optical deflector; and
an imaging optical system having an imaging optical element and being configured to image a light beam scanningly deflected by the deflecting surface of said optical deflector, on a surface to be scanned,
wherein the light beam incident on the deflecting surface of said optical deflector is obliquely incident in a sub-scan section with respect to a normal to the deflecting surface,
wherein said imaging optical element of said imaging optical system has at least one optical surface which is decentered in the sub-scan section,
wherein said incident optical element of said incident optical system has at least one optical surface having an aspherical surface shape being asymmetric, in the sub-scan section, with respect to a principal ray of a light beam passing through an optical element, and
wherein, when a thickness of said incident optical element in the sub-scan section and at a position where a first marginal light ray of the light beam passing through said incident optical system, which first marginal light ray is closer to an optical reference axis than the principal ray of that light beam is, passes, is denoted by dm1 (mm), while a thickness of said incident optical element at a position where a second marginal light ray further remote from the optical reference axis than the principal light ray of the light beam is, passes, is denoted by dm2 (mm), a relation $$dm1 < dm2$$

is satisfied, where the optical reference axis is defined as an axis which, when a principal ray of a light beam emitted from said incident optical system is scanningly deflected by the deflecting surface of said optical deflector and is then incident at a center of the surface to be scanned with respect to a main-scan direction, passes through a deflection point for the principal ray of the light beam on the deflecting surface in the sub-scan section and which is perpendicular to the deflecting surface.

2. An optical scanning device according to claim 1, wherein said incident optical element has a shape in the sub-scan section which shape is determined by different aspherical coefficients at the opposite sides of an optical axis of said incident optical element, and
wherein the aspherical coefficient at one side of the optical axis has a finite value while the aspherical coefficient at the other side of the optical axis is equal to zero.

3. An optical scanning device according to claim 1, wherein said incident optical element has a shape in the sub-scan section which shape is determined by different aspherical coefficients at the opposite sides of a principal ray of a light beam passing through said incident optical system, and
wherein the aspherical coefficient at one side of the principal ray close to the optical reference axis has a finite value while the aspherical coefficient at the other side of the principal ray remote from the optical reference axis is equal to zero.

4. An optical scanning device according to claim 1, wherein said incident optical element has a shape in the sub-scan section which shape is determined by different aspherical coefficients at the opposite sides of an optical axis of said incident optical element, and
wherein said different aspherical coefficients have different signs.

5. An optical scanning device according to claim 1, wherein, in a main-scan section, the shape of a meridional which connects sagittal vertexes of at least one optical surface of said imaging optical element is defined by a curved line which, from an axial position to an abaxial position in the main-scan direction, is curved to deviate in a direction leaving to the optical reference axis, with respect to a meridional shape to be defined based on a curvature radius on the optical reference axis.

6. An optical scanning device according to claim 1, wherein at least one optical surface of said imaging optical element is parallel decentered in the sub-scan section.

7. An optical scanning device according to claim 1, wherein at least one optical surface of said imaging optical element is rotationally decentered in the sub-scan section about an axis which is parallel to the main-scan direction.

8. An optical scanning device according to claim 6, wherein said imaging optical element having an optical surface parallel decentered in the sub-scan section has a positive power, and
wherein the parallel decentration is made in such direction that the optical axis of said imaging optical element leaves from the optical reference axis.

9. An image forming apparatus, comprising:
a plurality of optical scanning devices as recited in claim 1 and having a plurality of light source devices; and
common deflecting means shared by said plurality of optical scanning devices,
wherein a plurality of light beams emitted from said plurality of light source devices are scanningly deflected by said common deflecting means such that a plurality of surfaces to be scanned are scanned with the plurality of deflected light beams, respectively, whereby images are formed on the surfaces.

10. An image forming apparatus according to claim 9, wherein, when an imaging magnification of the imaging optical systems of said plurality of optical scanning devices in the sub-scan section is denoted by βs, a relation $$1.0 \leq |\beta s| \leq 3.0$$

is satisfied.

11. An image forming apparatus according to claim 10, wherein, when an oblique incidence angle defined between a principal ray of a light beam incident on the deflecting surface of said optical deflector and a normal to the deflecting surface is denoted by θs (deg), a relation $$1.0(\text{deg}) \leq \theta s \leq 5.0(\text{deg})$$

is satisfied.

12. An image forming apparatus, comprising:
   an optical scanning device as recited in claim 1;
   a photosensitive member disposed at a surface to be scanned;
   a developing device for developing an electrostatic latent image formed on said photosensitive member with a light beam scanningly deflected by said optical scanning device, to produce a toner image;
   a transferring device for transferring the developed toner image onto a transfer material; and
   a fixing device for fixing the transferred toner image, on the transfer material.

13. An image forming apparatus, comprising:
   an optical scanning device as recited in claim 1; and
   a printer controller for converting code data supplied from an outside machine into an imagewise signal and for inputting the imagewise signal into said optical scanning device.

* * * * *